US012628141B2

(12) United States Patent (10) Patent No.: US 12,628,141 B2
Ma et al. (45) Date of Patent: May 12, 2026

(54) BANDWIDTH PART CONFIGURATION FOR COMMUNICATION NETWORKS

(71) Applicant: QUALCOMM INCORPORATED, San Diego, CA (US)

(72) Inventors: Liangping Ma, San Diego, CA (US); Xiao Feng Wang, San Diego, CA (US); Peter Gaal, San Diego, CA (US); Ayan Sengupta, San Diego, CA (US); Alberto Rico Alvarino, San Diego, CA (US); Bharat Shrestha, San Diego, CA (US); Jun Ma, San Diego, CA (US); Umesh Phuyal, San Diego, CA (US); Dan Zhang, San Diego, CA (US); Huilin Xu, Temecula, CA (US); Yiqing Cao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 18/001,676

(22) PCT Filed: Jul. 2, 2020

(86) PCT No.: PCT/CN2020/099918
§ 371 (c)(1),
(2) Date: Dec. 13, 2022

(87) PCT Pub. No.: WO2022/000418
PCT Pub. Date: Jan. 6, 2022

(65) Prior Publication Data
US 2023/0232384 A1 Jul. 20, 2023

(51) Int. Cl.
*H04W 72/0453* (2023.01)
*H04B 7/06* (2006.01)
*H04W 72/23* (2023.01)

(52) U.S. Cl.
CPC .... *H04W 72/0453* (2013.01); *H04B 7/06952* (2023.05); *H04W 72/23* (2023.01)

(58) Field of Classification Search
CPC ............. H04W 72/0453; H04W 72/23; H04W 72/046; H04L 5/001; H04L 5/14;
(Continued)

(56) References Cited

U.S. PATENT DOCUMENTS

2019/0281480 A1 9/2019 Wei et al.
2020/0137741 A1 4/2020 Zhou et al.
(Continued)

FOREIGN PATENT DOCUMENTS

CN 110475279 A 11/2019
CN 110545138 A 12/2019
(Continued)

OTHER PUBLICATIONS

LG Electronics: "Feature Lead Summary#4 of Enhancements on Multi-beam Operations", 3GPP TSG RAN WG1 Meeting #98bis, R1-1911561, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 22, 2019, pp. 1-26, XP051798825, Table in pp. 14-15, p. 14-p. 15.
(Continued)

*Primary Examiner* — Dady Chery
(74) *Attorney, Agent, or Firm* — Holland & Hart LLP/QUALCOMM Incorporated

(57) ABSTRACT
Methods, systems, and devices for wireless communications are described. A user equipment (UE) may identify a beam used for communicating with a network entity, the beam associated with multiple bandwidth parts (BWPs) including a reference BWP with a first frequency. The UE may receive a BWP configuration from the network entity, the BWP
(Continued)

configuration based on changing a frequency for at least one BWP of the multiple BWPs form the first frequency to a second frequency. Additionally or alternatively, the UE may identify a timing threshold associated with a BWP switching operation for multiple BWPs associated with the beam. The UE may switch from the first BWP to a second BWP during the timing threshold. The UE may communicate with the network entity according to the BWP configuration or the second BWP.

39 Claims, 18 Drawing Sheets

(58) Field of Classification Search
CPC ... H04L 5/0023; H04L 5/0064; H04L 5/0092; H04B 7/0695
See application file for complete search history.

(56) References Cited

U.S. PATENT DOCUMENTS

| | | | | |
|---|---|---|---|---|
| 2021/0067234 A1* | 3/2021 | Guan | .................... | H04W 24/08 |
| 2022/0158721 A1* | 5/2022 | Alasti | ................ | H04W 72/046 |
| 2023/0224725 A1 | 7/2023 | Ma et al. | | |

FOREIGN PATENT DOCUMENTS

| | | | |
|---|---|---|---|
| CN | 111328143 A | 6/2020 | |
| KR | 20190054978 A | 5/2019 | |
| WO | WO-2019214382 A1 | 11/2019 | |
| WO | WO-2020029725 A1 | 2/2020 | |

OTHER PUBLICATIONS

Supplementary European Search Report—EP20942721—Search Authority—The Hague—Feb. 5, 2024.
Asia Pacific Telecom: "Discussion on Physical Layer Control Procedures for NTN", 3GPP TSG-RAN WG1 Meeting #98, R1-1908934, Prague, Czech Republic, Aug. 26-30, 2019, 6 Pages, Aug. 16, 2019, Section 2.2.
ZTE Corporation, et al., "Signalling Overhead Reduction for Cell Configuration and BWP Configuration", 3GPP TSG RAN WG2 Meeting #107bis, R2-1913492, Chongqing, China, Oct. 14-18, 2019, pp. 1-6, Oct. 4, 2019, Section 2.
Co-pending U.S. Appl. No. 17/304,528, inventor Ma; Liangping, filed Jun. 22, 2021.
Co-pending U.S. Appl. No. 17/304,955, inventor Ma; Liangping, filed Jun. 29, 2021.
Co-pending U.S. Appl. No. 17/324,982, inventor Shrestha; Bharat, filed May 19, 2021.
Co-pending U.S. Appl. No. 17/359,291, inventor Ma; Liangping, filed Jun. 25, 2021.
Co-pending U.S. Appl. No. 17/359,377, inventor Ma; Liangping, filed Jun. 25, 2021.
International Search Report and Written Opinion—PCT/CN2020/099918—ISA/EPO—Feb. 25, 2021.
Panasonic: "Discussion on Beam Management and Polarization for NTN", 3GPP Draft, 3GPP TSG RAN WG1 #99, R1-1912902, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18-22, 2019, Nov. 8, 2019 (Nov. 8, 2019), XP051820237, 3 Pages, Section 2 and Section 3, The Whole Document.

* cited by examiner

BWP 1

BWP 2

| 10 ms | 10 ms | 10 ms | 10 ms | 10 ms |

Network Entity — 220

230-c 230-b 230-a

UE 215

230-a 230-b 230-c

Beam Footprint 235

200

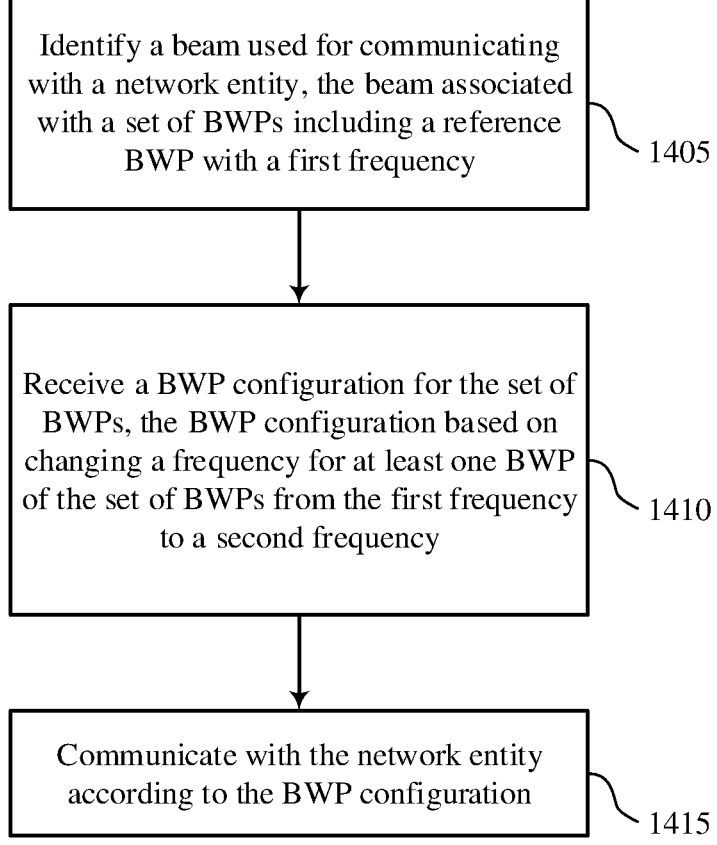

Identify a beam used for communicating with a network entity, the beam associated with a set of BWPs including a reference BWP with a first frequency

1405

Receive a BWP configuration for the set of BWPs, the BWP configuration based on changing a frequency for at least one BWP of the set of BWPs from the first frequency to a second frequency

1410

Communicate with the network entity according to the BWP configuration

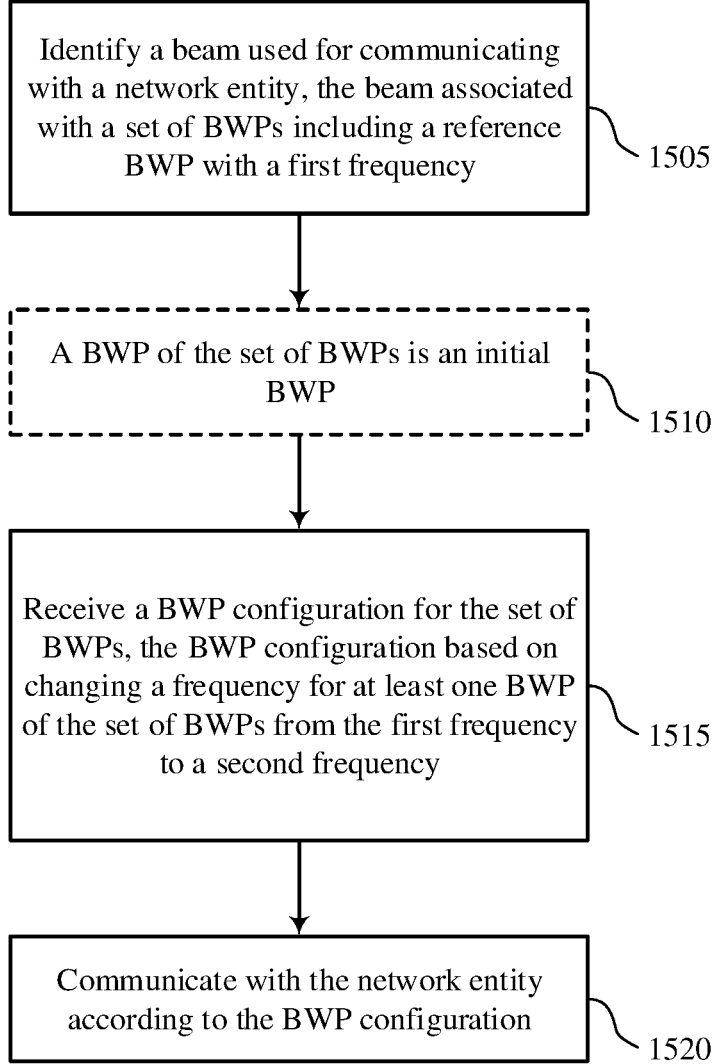

Identify a beam used for communicating with a network entity, the beam associated with a set of BWPs including a reference BWP with a first frequency

1505

A BWP of the set of BWPs is an initial BWP

1510

Receive a BWP configuration for the set of BWPs, the BWP configuration based on changing a frequency for at least one BWP of the set of BWPs from the first frequency to a second frequency

1515

Communicate with the network entity according to the BWP configuration

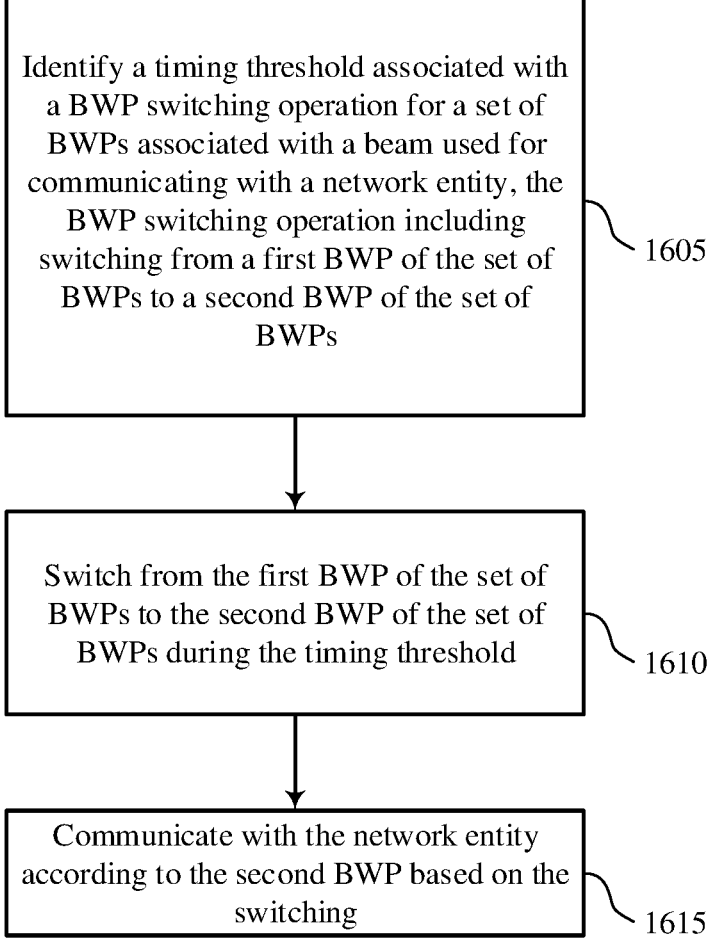

Identify a timing threshold associated with a BWP switching operation for a set of BWPs associated with a beam used for communicating with a network entity, the BWP switching operation including switching from a first BWP of the set of BWPs to a second BWP of the set of BWPs

1605

Switch from the first BWP of the set of BWPs to the second BWP of the set of BWPs during the timing threshold

1610

Communicate with the network entity according to the second BWP based on the switching

Transmit, to a UE, an indication of a BWP configuration corresponding to a set of BWPs associated with a beam used for communicating with the UE, the BWP configuration based on changing a frequency for the set of BWPs from a first frequency associated with a reference BWP to a second frequency

1705

Communicate with the UE according to the BWP configuration

1710

1700

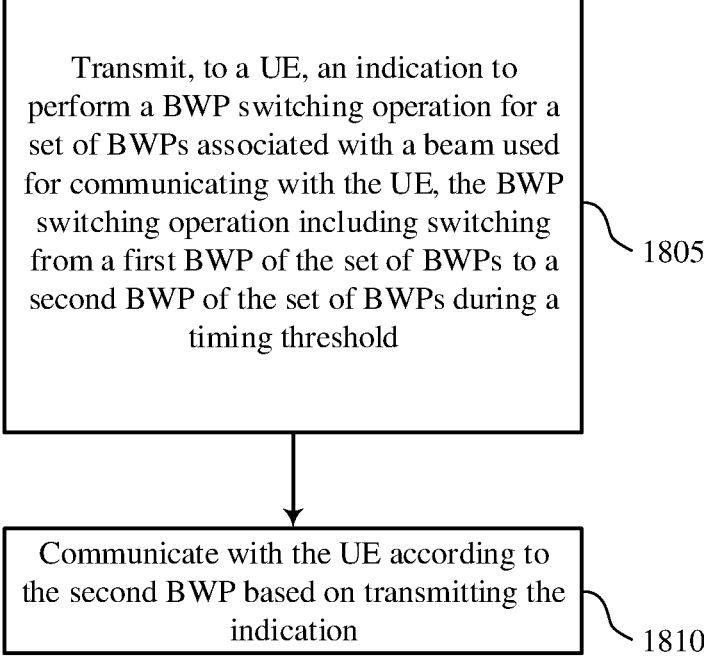

Transmit, to a UE, an indication to perform a BWP switching operation for a set of BWPs associated with a beam used for communicating with the UE, the BWP switching operation including switching from a first BWP of the set of BWPs to a second BWP of the set of BWPs during a timing threshold

1805

Communicate with the UE according to the second BWP based on transmitting the indication

BANDWIDTH PART CONFIGURATION FOR COMMUNICATION NETWORKS

CROSS REFERENCE

The present Application is a 371 national stage filing of International PCT Application No. PCT/CN2020/099918 by M A et al. entitled "BANDWIDTH PART CONFIGURA-TION FOR COMMUNICATION NETWORKS," filed Jul. 2, 2020, which is assigned to the assignee hereof, and which is expressly incorporated by reference in its entirety herein.

INTRODUCTION

The following relates generally to wireless communica-tions and more specifically to reliability enhancements at a user equipment (UE).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wire-less multiple-access communications system may include one or more base stations or one or more network access nodes, each simultaneously supporting communication for multiple communication devices, which may be otherwise known as user equipment (UE).

SUMMARY

A method of wireless communications at a UE is described. The method may include identifying a beam used for communicating with a network entity, the beam associ-ated with a set of bandwidth parts (BWPs) including a reference BWP with a first frequency, receiving a BWP configuration for the set of BWPs, the BWP configuration based on changing a frequency for at least one BWP of the set of BWPs from the first frequency to a second frequency, and communicating with the network entity according to the BWP configuration.

An apparatus for wireless communications at a UE is described. The apparatus may include a processor, memory coupled with the processor, and instructions stored in the memory. The instructions may be executable by the proces-sor to cause the apparatus to identify a beam used for communicating with a network entity, the beam associated with a set of BWPs including a reference BWP with a first frequency, receive a BWP configuration for the set of BWPs, the BWP configuration based on changing a frequency for at least one BWP of the set of BWPs from the first frequency to a second frequency, and communicate with the network entity according to the BWP configuration.

Another apparatus for wireless communications at a UE is described. The apparatus may include means for identifying a beam used for communicating with a network entity, the beam associated with a set of BWPs including a reference BWP with a first frequency, receiving a BWP configuration for the set of BWPs, the BWP configuration based on changing a frequency for at least one BWP of the set of BWPs from the first frequency to a second frequency, and communicating with the network entity according to the BWP configuration.

A non-transitory computer-readable medium storing code for wireless communications at a UE is described. The code may include instructions executable by a processor to iden-tify a beam used for communicating with a network entity, the beam associated with a set of BWPs including a refer-ence BWP with a first frequency, receive a BWP configu-ration for the set of BWPs, the BWP configuration based on changing a frequency for at least one BWP of the set of BWPs from the first frequency to a second frequency, and communicate with the network entity according to the BWP configuration.

In some examples of the method, apparatuses, and non-transitory computer-readable medium described herein, the receiving the BWP configuration may include operations, features, means, or instructions for identifying a BWP configuration for each BWP of the set of BWPs may be determined independent of the reference BWP, and receiv-ing the BWP configuration for the each BWP of the set of BWPs.

Some examples of the method, apparatuses, and non-transitory computer-readable medium described herein may further include operations, features, means, or instructions for receiving, from the network entity, an indication that the BWP configuration may be determined independent of the reference BWP, where receiving the BWP configuration for each BWP of the set of BWPs may be based on the received indication.

In some examples of the method, apparatuses, and non-transitory computer-readable medium described herein, the receiving the BWP configuration may include operations, features, means, or instructions for receiving a BWP con-figuration for a set of the set of BWPs on the beam.

In some examples of the method, apparatuses, and non-transitory computer-readable medium described herein, the receiving the BWP configuration may include operations, features, means, or instructions for receiving a first BWP configuration for a first set of the set of BWPs on a first beam, the first beam used for communicating with the network entity, and receiving a second BWP configuration on a second beam, the second beam different than the first beam.

Some examples of the method, apparatuses, and non-transitory computer-readable medium described herein may further include operations, features, means, or instructions for determining that the second BWP configuration may be for a second set of the set of BWPs associated with the second beam and may be based on the reference BWP, the first set of the set of BWPs including the reference BWP.

Some examples of the method, apparatuses, and non-transitory computer-readable medium described herein may further include operations, features, means, or instructions for determining a first IE associated with the reference BWP may be the same as a second IE associated with a BWP in the second set of the set of BWPs, where the second BWP configuration includes an identifier corresponding to the reference BWP.

Some examples of the method, apparatuses, and non-transitory computer-readable medium described herein may further include operations, features, means, or instructions for determining the first information element (IE) and the second IE may be the same based on an absence of the second IE.

Some examples of the method, apparatuses, and non-transitory computer-readable medium described herein may further include operations, features, means, or instructions for receiving, from the network entity, a message indicating the first IE and the second IE may be the same, where determining the first IE may be the same as the second IE may be based on the message.

Some examples of the method, apparatuses, and non-transitory computer-readable medium described herein may further include operations, features, means, or instructions for receiving, in the second BWP configuration, an indication of a difference between the first frequency and the second frequency and an identifier corresponding to the reference BWP, the second frequency associated with the second set of the set of BWPs.

Some examples of the method, apparatuses, and non-transitory computer-readable medium described herein may further include operations, features, means, or instructions for receiving, from the network entity, an indicator corresponding to the BWP configuration, where receiving the second BWP configuration on the second beam may be based on the received indicator.

Some examples of the method, apparatuses, and non-transitory computer-readable medium described herein may further include operations, features, means, or instructions for receiving the BWP configuration via an RRC signaling message, a SIB, or both.

Some examples of the method, apparatuses, and non-transitory computer-readable medium described herein may further include operations, features, means, or instructions for receiving, from the network entity, an indication of the reference BWP including a BWP identifier, a beam identifier, or both.

Some examples of the method, apparatuses, and non-transitory computer-readable medium described herein may further include operations, features, means, or instructions for receiving, from the network entity, an indication of a difference between the first frequency and the second frequency, the indication including an integer multiplier, a beam identifier, a synchronization signal block (SSB) index, or a combination.

Some examples of the method, apparatuses, and non-transitory computer-readable medium described herein may further include operations, features, means, or instructions for receiving, from the network entity, a configuration corresponding to a mapping of the indication to the difference between the first frequency and the second frequency.

In some examples of the method, apparatuses, and non-transitory computer-readable medium described herein, the identifying the beam may include operations, features, means, or instructions for identifying an SSB index, a cell identifier, a beam identifier, or a combination thereof.

A method of wireless communications at a UE is described. The method may include identifying a timing threshold associated with a BWP switching operation for a set of BWPs associated with a beam used for communicating with a network entity, the BWP switching operation including switching from a first BWP of the set of BWPs to a second BWP of the set of BWPs, switching from the first BWP of the set of BWPs to the second BWP of the set of BWPs during the timing threshold, and communicating with the network entity according to the second BWP based on the switching.

An apparatus for wireless communications at a UE is described. The apparatus may include a processor, memory coupled with the processor, and instructions stored in the memory. The instructions may be executable by the processor to cause the apparatus to identify a timing threshold associated with a BWP switching operation for a set of BWPs associated with a beam used for communicating with a network entity, the BWP switching operation including switching from a first BWP of the set of BWPs to a second BWP of the set of BWPs, switch from the first BWP of the set of BWPs to the second BWP of the set of BWPs during the timing threshold, and communicate with the network entity according to the second BWP based on the switching.

Another apparatus for wireless communications at a UE is described. The apparatus may include means for identifying a timing threshold associated with a BWP switching operation for a set of BWPs associated with a beam used for communicating with a network entity, the BWP switching operation including switching from a first BWP of the set of BWPs to a second BWP of the set of BWPs, switching from the first BWP of the set of BWPs to the second BWP of the set of BWPs during the timing threshold, and communicating with the network entity according to the second BWP based on the switching.

A non-transitory computer-readable medium storing code for wireless communications at a UE is described. The code may include instructions executable by a processor to identify a timing threshold associated with a BWP switching operation for a set of BWPs associated with a beam used for communicating with a network entity, the BWP switching operation including switching from a first BWP of the set of BWPs to a second BWP of the set of BWPs, switch from the first BWP of the set of BWPs to the second BWP of the set of BWPs during the timing threshold, and communicate with the network entity according to the second BWP based on the switching.

Some examples of the method, apparatuses, and non-transitory computer-readable medium described herein may further include operations, features, means, or instructions for receiving, from the network entity, an indication to perform the BWP switching operation, where switching from the first BWP to the second BWP may be based on the indication.

Some examples of the method, apparatuses, and non-transitory computer-readable medium described herein may further include operations, features, means, or instructions for receiving, from the network entity, an indication of the timing threshold associated with the BWP switching operation.

Some examples of the method, apparatuses, and non-transitory computer-readable medium described herein may further include operations, features, means, or instructions for determining a first difference between a first frequency associated with the first BWP and a second frequency associated with the second BWP, the timing threshold based on the first difference between the first frequency and the second frequency.

Some examples of the method, apparatuses, and non-transitory computer-readable medium described herein may further include operations, features, means, or instructions for determining a second difference between a first set of parameters associated with the first BWP and a second set of parameters associated with the second BWP, the timing threshold based on the second difference between the first set of parameters and the second set of parameters.

A method of wireless communications at a network entity is described. The method may include transmitting, to a UE, an indication of a BWP configuration corresponding to a set of BWPs associated with a beam used for communicating with the UE, the BWP configuration based on changing a frequency for the set of BWPs from a first frequency associated with a reference BWP to a second frequency and communicating with the UE according to the BWP configuration.

An apparatus for wireless communications at a network entity is described. The apparatus may include a processor, memory coupled with the processor, and instructions stored in the memory. The instructions may be executable by the processor to cause the apparatus to transmit, to a UE, an indication of a BWP configuration corresponding to a set of BWPs associated with a beam used for communicating with the UE, the BWP configuration based on changing a frequency for the set of BWPs from a first frequency associated with a reference BWP to a second frequency and communicate with the UE according to the BWP configuration.

Another apparatus for wireless communications at a network entity is described. The apparatus may include means for transmitting, to a UE, an indication of a BWP configuration corresponding to a set of BWPs associated with a beam used for communicating with the UE, the BWP configuration based on changing a frequency for the set of BWPs from a first frequency associated with a reference BWP to a second frequency and communicating with the UE according to the BWP configuration.

A non-transitory computer-readable medium storing code for wireless communications at a network entity is described. The code may include instructions executable by a processor to transmit, to a UE, an indication of a BWP configuration corresponding to a set of BWPs associated with a beam used for communicating with the UE, the BWP configuration based on changing a frequency for the set of BWPs from a first frequency associated with a reference BWP to a second frequency and communicate with the UE according to the BWP configuration.

In some examples of the method, apparatuses, and non-transitory computer-readable medium described herein, the transmitting the BWP configuration may include operations, features, means, or instructions for determining a BWP configuration for each BWP of the set of BWPs independent of the reference BWP, and transmitting the BWP configuration for each BWP of the set of BWPs.

Some examples of the method, apparatuses, and non-transitory computer-readable medium described herein may further include operations, features, means, or instructions for transmitting, to the UE, an indication that the BWP configuration may be determined independent of the reference BWP, where transmitting the BWP configuration for each BWP of the set of BWPs may be based on the indicator.

In some examples of the method, apparatuses, and non-transitory computer-readable medium described herein, the transmitting the BWP configuration may include operations, features, means, or instructions for transmitting a BWP configuration for a set of the set of BWPs on the beam.

In some examples of the method, apparatuses, and non-transitory computer-readable medium described herein, the transmitting the BWP configuration may include operations, features, means, or instructions for transmitting a first BWP configuration for a first set of the set of BWPs on a first beam, the first beam used for communicating with the UE, and transmitting a second BWP configuration on a second beam, the second beam different than the first beam.

Some examples of the method, apparatuses, and non-transitory computer-readable medium described herein may further include operations, features, means, or instructions for determining that the second BWP configuration may be for a second set of the set of BWPs associated with the second beam and may be based on the reference BWP, the first set of the set of BWPs including the reference BWP.

Some examples of the method, apparatuses, and non-transitory computer-readable medium described herein may further include operations, features, means, or instructions for determining a first IE associated with the reference BWP may be the same as a second IE associated with a BWP in the second set of the set of BWPs, where the second BWP configuration includes an identifier corresponding to the reference BWP.

Some examples of the method, apparatuses, and non-transitory computer-readable medium described herein may further include operations, features, means, or instructions for determining the first IE and the second IE may be the same based on an absence of the second IE.

Some examples of the method, apparatuses, and non-transitory computer-readable medium described herein may further include operations, features, means, or instructions for transmitting, to the UE, a message indicating the first IE and the second IE may be the same, where determining the first IE may be the same as the second IE may be based on the message.

Some examples of the method, apparatuses, and non-transitory computer-readable medium described herein may further include operations, features, means, or instructions for transmitting, in the second BWP configuration, an indication of a difference between the first frequency and the second frequency and an identifier corresponding to the reference BWP, the second frequency associated with the second set of the set of BWPs.

Some examples of the method, apparatuses, and non-transitory computer-readable medium described herein may further include operations, features, means, or instructions for transmitting, to the UE, an indicator corresponding to the BWP configuration, where receiving the second BWP configuration may be based on the received indicator.

Some examples of the method, apparatuses, and non-transitory computer-readable medium described herein may further include operations, features, means, or instructions for transmitting the BWP configuration via a radio resource control (RRC) signaling message, a system information block (SIB), or both.

Some examples of the method, apparatuses, and non-transitory computer-readable medium described herein may further include operations, features, means, or instructions for transmitting, to the UE, an indication of the reference BWP including a BWP identifier, a beam identifier, or both.

Some examples of the method, apparatuses, and non-transitory computer-readable medium described herein may further include operations, features, means, or instructions for transmitting, to the UE, an indication of a difference between the first frequency and the second frequency, the indication including an integer multiplier, a beam identifier, an SSB index, or a combination.

Some examples of the method, apparatuses, and non-transitory computer-readable medium described herein may further include operations, features, means, or instructions for transmitting, to the UE, a configuration corresponding to a mapping of the indication to the difference between the first frequency and the second frequency.

A method of wireless communications at a network entity is described. The method may include transmitting, to a UE, an indication to perform a BWP switching operation for a set of BWPs associated with a beam used for communicating with the UE, the BWP switching operation including switching from a first BWP of the set of BWPs to a second BWP of the set of BWPs during a timing threshold and communicating with the UE according to the second BWP based on transmitting the indication.

An apparatus for wireless communications at a network entity is described. The apparatus may include a processor, memory coupled with the processor, and instructions stored in the memory. The instructions may be executable by the processor to cause the apparatus to transmit, to a UE, an indication to perform a BWP switching operation for a set of BWPs associated with a beam used for communicating with the UE, the BWP switching operation including switching from a first BWP of the set of BWPs to a second BWP of the set of BWPs during a timing threshold and communicate with the UE according to the second BWP based on transmitting the indication.

Another apparatus for wireless communications at a network entity is described. The apparatus may include means for transmitting, to a UE, an indication to perform a BWP switching operation for a set of BWPs associated with a beam used for communicating with the UE, the BWP switching operation including switching from a first BWP of the set of BWPs to a second BWP of the set of BWPs during a timing threshold and communicating with the UE according to the second BWP based on transmitting the indication.

A non-transitory computer-readable medium storing code for wireless communications at a network entity is described. The code may include instructions executable by a processor to transmit, to a UE, an indication to perform a BWP switching operation for a set of BWPs associated with a beam used for communicating with the UE, the BWP switching operation including switching from a first BWP of the set of BWPs to a second BWP of the set of BWPs during a timing threshold and communicate with the UE according to the second BWP based on transmitting the indication.

Some examples of the method, apparatuses, and non-transitory computer-readable medium described herein may further include operations, features, means, or instructions for transmitting, to the UE, an indication of the timing threshold associated with the BWP switching operation.

Some examples of the method, apparatuses, and non-transitory computer-readable medium described herein may further include operations, features, means, or instructions for determining a first difference between a first frequency associated with the first BWP and a second frequency associated with the second BWP, the timing threshold based on the first difference between the first frequency and the second frequency.

Some examples of the method, apparatuses, and non-transitory computer-readable medium described herein may further include operations, features, means, or instructions for determining a second difference between a first set of parameters associated with the first BWP and a second set of parameters associated with the second BWP, the timing threshold based on the second difference between the first set of parameters and the second set of parameters.

BRIEF DESCRIPTION OF THE DRAWINGS

FIGS. 14 through 18 show flowcharts illustrating methods that support BWP configuration for communication networks in accordance with aspects of the present disclosure.

DETAILED DESCRIPTION

Figure 1:
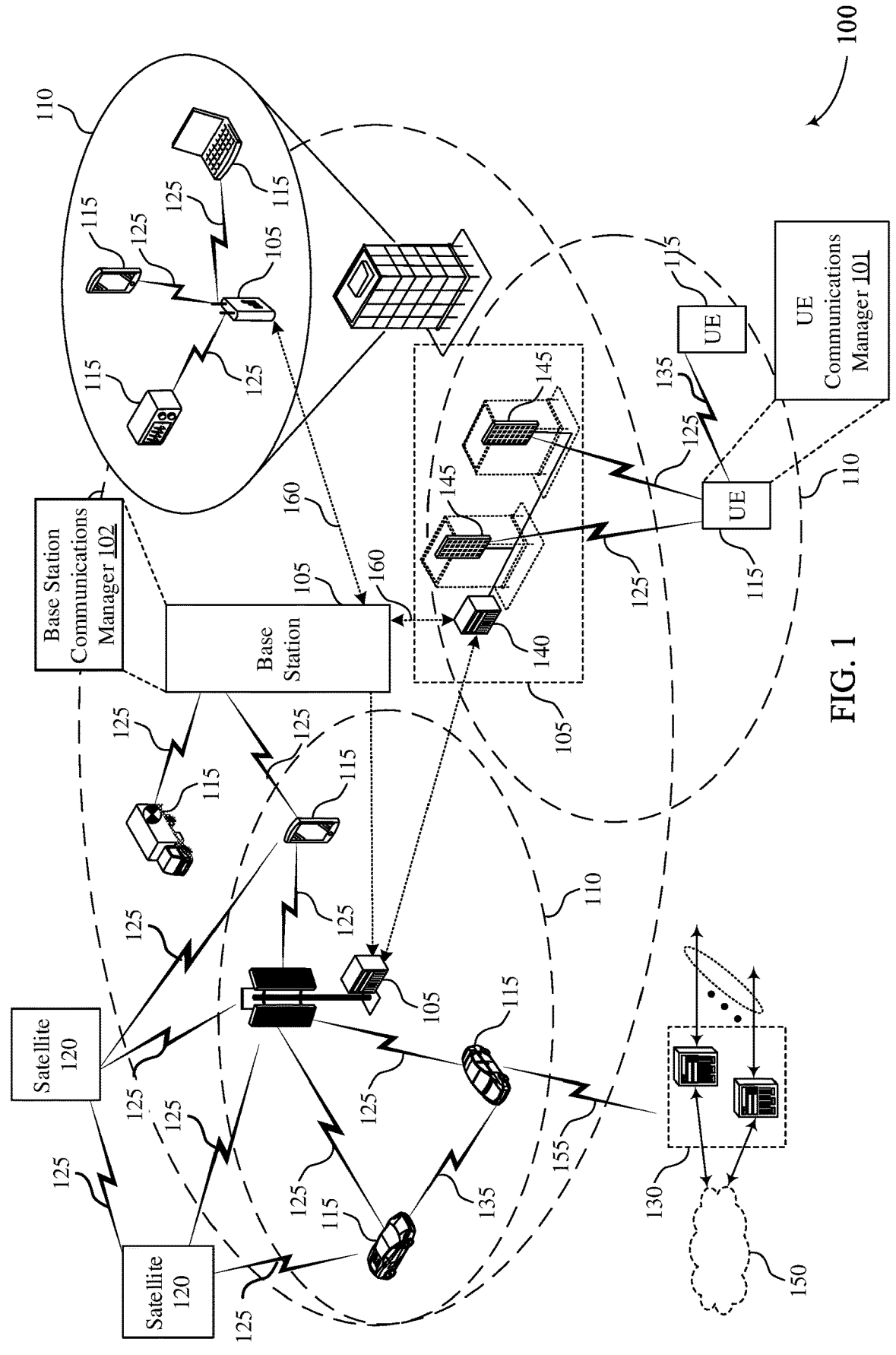
FIGS. 1 through 3 illustrate examples of wireless communications systems that support BWP configuration for communication networks in accordance with aspects of the present disclosure.

In some cases, a UE and a network entity may transmit control information or data messages using one or more beams associated with one or more BWPs. In some examples, the network entity may be an example of a satellite or a base station. The network entity and the UE may be thousands of kilometers apart and it may take some time for electromagnetic waves to propagate over the distance between the satellite and the UE. The distance that a transmission travels may result in substantial signal degradation due to, for example, atmospheric effects, interference from other radio frequency sources, signal attenuation due to vegetation or structures, and the like. Further, due to the high mobility of the UE relative to the network entity, the UE may frequently switch beams. In some cases, one or more BWPs may be configured for a beam per UE. Thus, the UE may use multiple BWP configurations corresponding to BWPs associated with a new beam in the beam switching procedure, which may cause high signaling volume and inefficient resource allocation at the UE (e.g., due to BWP configuration signaling in cell search operations).

In some examples, the UE may receive one or more configurations for BWPs from a network entity. In some cases, the BWPs may be initial BWPs. For example, the network entity may configure multiple initial downlink BWPs, multiple initial uplink BWPs, or both for each cell, where each cell may include one or more beams. In some cases, the BWP configuration may include a BWP configuration for each BWP associated with a beam. In some other cases, the BWP configuration (e.g., including a downlink BWP or an uplink BWP configuration) may correspond to a reference BWP. In some cases, the reference BWP may be within the beam. Additionally or alternatively, the reference BWP may be associated within a different beam. In some cases, the different beam may be from the network entity or another network entity.

In some examples, the network entity may indicate a frequency shift corresponding to downlink BWPs associated with the beam and a reference downlink BWP, the identifier of the reference downlink BWP, or both. Additionally or alternatively, the network entity may configure the initial BWPs (e.g., an uplink BWP, a downlink BWP, or both) for the beam, and may use this configuration as a reference to configure the initial BWPs for one or more other beams by a frequency shift. For example, the UE may apply the frequency shift to the reference initial BWPs to derive the initial BWPs for a new beam. In some examples, the BWP configuration may configure multiple BWPs according to the frequency shift. For example, the network entity may transmit a frequency shift indicator, an indication of the one or more reference BWPs, or both. In some cases, the network entity may include the frequency shift indicator, the indication of the one or more reference BWPs, or both in the BWP configuration. In some cases, the UE may apply the frequency shift (e.g., indicated in the BWP configuration) to the one or more reference BWPs to derive new BWPs. In some examples, the network entity may transmit an indication to the UE that the BWPs associated with the BWP configuration are independently configured or are configured with reference to one or more other BWPs.

In some cases, the UE may switch from one or more old BWPs to one or more new BWPs within a BWP switch delay. For example, the UE may switch from an old initial BWP to a new initial BWP within a switch delay. In some examples, the BWP switch delay may be based on a UE capability, a subcarrier spacing, a difference between the old BWPs and the new BWPs, or a combination. In some cases, the network entity may indicate the configuration for the BWP switch delay to the UE in the BWP configuration. In some other examples, the configuration for the BWP switch delay may be inferred by the UE and the network entity based on a rule that maps a BWP switching operation into one or more groups, each group representing a level of difference in the BWPs involved in the BWP switching operation.

Aspects of the disclosure are initially described in the context of wireless communications systems. Additional aspects are described with reference to process flows. Aspects of the disclosure are further illustrated by and described with reference to apparatus diagrams, system diagrams, and flowcharts that relate to BWP configuration for communication networks.

FIG. 1 illustrates an example of a wireless communications system 100 that supports default satellite beam for communication networks in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 160 (e.g., via an S1, N2, N3, or other interface). The base stations 105 may communicate with one another over the backhaul links 160 (e.g., via an X2, Xn, or other interface) either directly (e.g., directly between base stations 105), or indirectly (e.g., via core network 130), or both. In some examples, the backhaul links 160 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). In some cases, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 includes base stations 105, UEs 115, satellites 120, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Wireless communications system 100 may also include one or more satellites 120. A satellite 120 may communicate with base stations 105 (also referred to as gateways in NTNs) and UEs 115 (or other high altitude or terrestrial communications devices). The satellite 120 may be any suitable type of communication satellite configured to relay communications between different end nodes in a wireless communication system. The satellite 120 may be an example of a space satellite, a balloon, a dirigible, an airplane, a drone, an unmanned aerial vehicle, or the like. In some examples, the satellite 120 may be in a geosynchronous or geostationary earth orbit, a low earth orbit or a medium earth orbit. A satellite 120 may be a multi-beam satellite configured to provide service for multiple service beam coverage areas in a predefined geographical service area. The satellite 120 may be any distance away from the surface of the earth. A satellite 120 may be a high altitude platform station (HAPS), e.g., a balloon.

In some cases, a cell may be provided or established by a satellite 120 as part of a non-terrestrial network. A satellite 120 may, in some cases, perform the functions of a base station 105, act as a bent-pipe satellite, or may act as a regenerative satellite, or a combination thereof. In other cases, satellite 120 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 120) may receive a signal from a base station 105 and may relay the signal to a UE 115 or base station 105, or vice-versa. In accordance with one or more aspects of the present disclosure, a UE 115 may communicate with a cell provided or established by a satellite 120 (e.g., via a base station 105 or a satellite 120 performing the functions of a base station 105) according to an identified default set of one or more beams based on an inactivity timer expiring, which may enhance communications reliability.

In some cases, a UE 115 and a network entity may transmit control information or data messages using one or more beams associated with one or more BWPs. In some examples, the network entity may be an example of a satellite 120. In some cases, the network entity may be an example of a base station 105. The satellite 120, or the network entity, and the UE 115 may be thousands of kilometers apart and it may take some time for electromagnetic waves to propagate over the distance between the satellite 120 and the UE 115. The distance that a transmission travels may result in substantial signal degradation due to, for example, atmospheric effects, interference from other radio frequency sources, signal attenuation due to vegetation or structures, and the like. Further, due to the high mobility of the UE 115 relative to the network entity, the UE 115 may frequently switch beams. In some cases, one or more BWPs may be configured for a beam per UE 115. Thus, the UE 115 may use multiple BWP configurations corresponding to BWPs associated with a new beam in the beam switching procedure, which may cause high signaling volume and inefficient resource allocation at the UE 115 (e.g., due to BWP configuration signaling in cell search operations).

In some examples, the UE 115 may receive one or more configurations for BWPs from a network entity. In some cases, the BWPs may be initial BWPs. For example, the network entity may configure multiple initial downlink BWPs, multiple initial uplink BWPs, or both for each cell, where each cell may include one or more beams. Each beam may have an initial downlink BWP and an initial uplink BWP, but may share an initial downlink BWP, an initial uplink BWP, or both with another beam. In some cases, the BWP configuration may include a BWP configuration for each BWP associated with a beam. In some other cases, the BWP configuration (e.g., including a downlink BWP or an uplink BWP configuration) may correspond to a reference BWP. In some cases, the reference BWP may be within the beam. Additionally or alternatively, the reference BWP may be associated within a different beam. In some cases, the different beam may be from the network entity or another network entity.

In some cases, the network entity may indicate a frequency shift corresponding to downlink BWPs associated with the beam and a reference downlink BWP, the identifier of the reference downlink BWP, or both. Additionally or alternatively, the network entity may configure the initial BWPs (e.g., an uplink BWP, a downlink BWP, or both) for the beam, and may use this configuration as a reference to configure the initial BWPs for one or more other beams by a frequency shift. For example, the UE 115 may apply the frequency shift to the reference initial BWPs to derive the initial BWPs for a new beam. In some examples, the BWP configuration may configure multiple BWPs according to the frequency shift. For example, the network entity may transmit a frequency shift indicator, an indication of the one or more reference BWPs, or both. In some cases, the network entity may include the frequency shift indicator, the indication of the one or more reference BWPs, or both in the BWP configuration. In some cases, the UE 115 may apply the frequency shift (e.g., indicated in the BWP configuration) to the one or more reference BWPs to derive new BWPs. In some examples, the network entity may transmit an indication to the UE 115 that the BWPs associated with the BWP configuration are independently configured or are configured with reference to one or more other BWPs.

In some cases, the UE 115 may switch from one or more old BWPs to one or more new BWPs within a BWP switch delay. For example, the UE 115 may switch from an old initial BWP to a new initial BWP within a switch delay. In some examples, the BWP switch delay may be based on a UE capability, a subcarrier spacing, a difference between the old BWPs and the new BWPs, or a combination. In some cases, the network entity may indicate the configuration for the BWP switch delay to the UE 115 in the BWP configuration. In some other examples, the configuration for the BWP switch delay may be inferred by the UE 115 and the network entity based on a rule that maps a BWP switching operation into one or more groups, each group representing a level of difference in the BWPs involved in the BWP switching operation.

Figure 2:
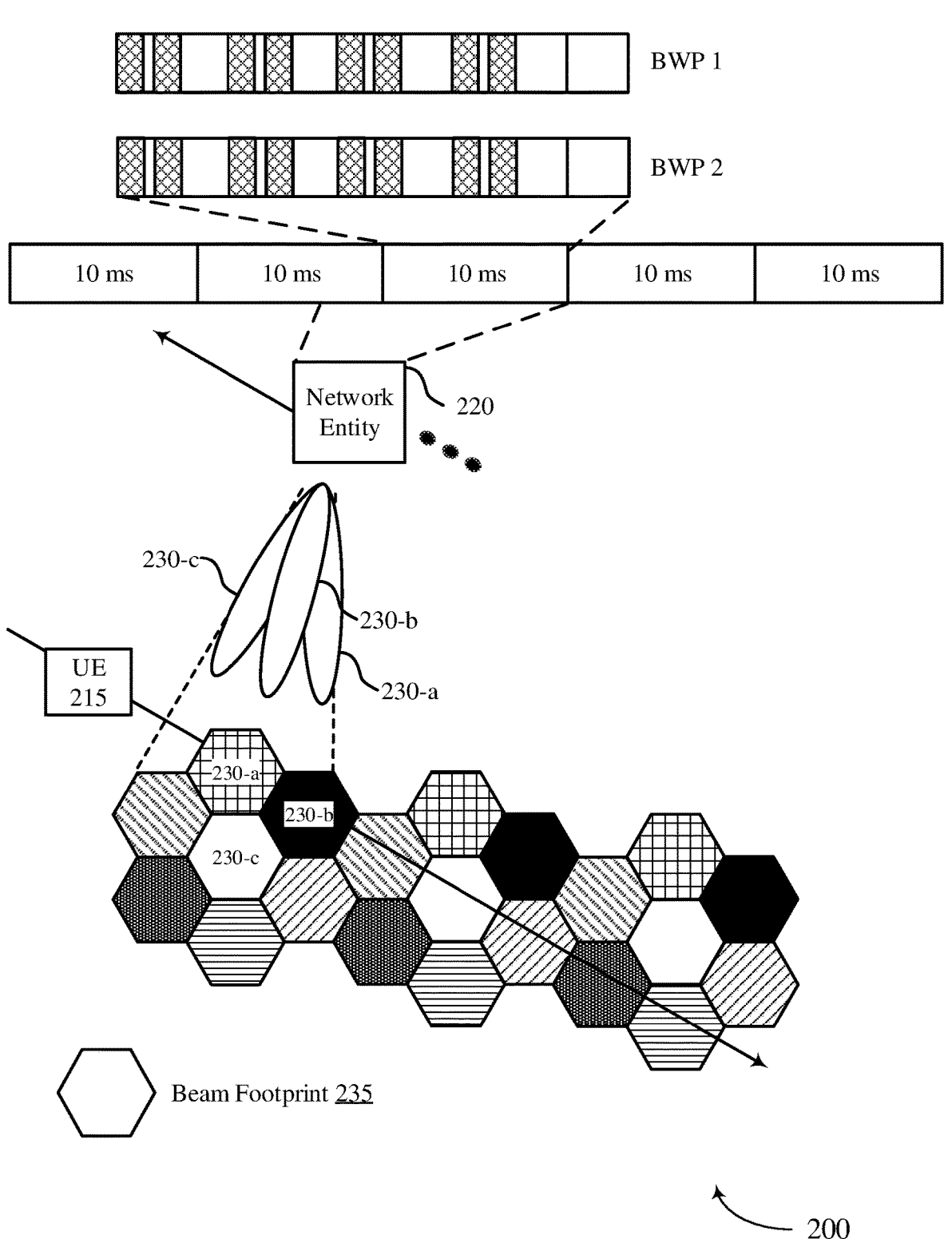

FIG. 2 illustrates an example of a wireless communications system 200 that supports BWP configuration for communication networks in accordance with aspects of the present disclosure. In some examples, wireless communications system 200 may implement aspects of wireless communication system 100. The wireless communications system 200 may include a network entity 220 and a UE 215, which may be an example of a UE 115 as described with respect to FIG. 1. The network entity 220 may be a satellite (e.g., satellite 120 of FIG. 1), but the network entity may be an example of a base station 105 as described with respect to FIG. 1. The network entity 220 may also be an example of a low earth orbit satellite 120 or other type of satellite 120. As such, the wireless network 200 may be an example of an NTN, a terrestrial network, or a combination of an NTN and terrestrial network.

In some wireless communication environments, beam switching may be frequent relative to other environments. In some cases, as illustrated in FIG. 2, a network entity 220 may communicate with a UE 215 via a beam 230, which may be a directional beam. The beam 230 may have a beam footprint 235 (e.g., a coverage area of the beam 230). For example, the network entity 220 may communicate with the UE 215 via beam 230-*a*. Additionally or alternatively, the network entity 220 may use beam 230-*b* or beam 230-*c* for communications. The UE 215 may, in some examples, derive a beam footprint shape (e.g., hexagonal, circular, elliptical, or the like) based on the shape and structure of the antenna associated with the beam 230. In some other examples, the UE 215 may derive a beam size based on one or more power levels associated with the beam 230. The shape and size of the footprint may depend on the distance of the transmitting device (e.g., network entity 220) from the surface of the earth, the transmitting angle, and the like. Further, footprints that are adjacent may have different shapes and sizes dependent on the transmission angle and distance of the transmitting device. In some cases, beam footprints 235 may overlap. The beam footprint 235 may be small relative to the speed of a network entity 220. In some other examples, the frequency of beam switching may depend on the mobility of the UE 215, the mobility of the UE 215 in combination with movement of a base station (e.g., a base station 105 as described with reference to FIG. 1), or both. The network entity may configure each beam 230 from a satellite as a cell with an initial BWP per beam (e.g., an initial uplink BWP, an initial downlink BWP, or an uplink BWP and downlink BWP pair). Each pattern of the beam footprint 235 in FIG. 2 may represent a different initial BWP. In some cases, each beam 230 may be associated with one or more BWPs in addition to the initial BWP, which the UE 215 and the network 220 may use to communicate. The network (e.g., network entity 220) may signal to the UE 215 which BWP to utilize as the beam footprints 235 move or the UE 215 moves.

In some cases, one or more BWPs may be configured for a beam 230 (e.g., satellite beam) per UE 215. Each beam 230 may be configured with an initial uplink bandwidth part and an initial downlink bandwidth part. Each beam 230 may also be configured with a default uplink bandwidth part and a default downlink bandwidth part for a UE 215. Additional bandwidth parts may be configured per satellite beam. As noted herein, the network entity 220 may configure BWPs in a beam 230 for the UE 215. The UE 215 may switch BWPs during a BWP switching operation. There may be two types of BWP switching operations. In inter-beam switching, a UE 215 may switch from a BWP in a beam 230 to a BWP in a different beam 230 (e.g., from a BWP in beam 230-*a* to a BWP in beam 230-*b*). For example, if the UE 215 moves from a beam footprint 235 associated with beam 230-*a* to a beam footprint 235 associated with beam 230-*b*, the UE may switch from a BWP in beam 230-*a* to a BWP in beam 230-*b*. In intra-beam BWP switching, a UE 215 may switch from a BWP to a different BWP in the same beam 230. For example, if the UE 215 performs a BWP switching operation without leaving the beam footprint 235 associated with beam 230-*a*, the UE 215 may switch from a BWP associated with beam 230-*a* to another BWP associated with beam 230-*a*. In some examples, the network entity 220 may configure the one or more beams 230 as a single cell. In some other examples, the network entity 220 may configure the one or more beams 230 as separate cells or as multiple cells. That is, each cell may include one or more beams 230 corresponding to beam footprints 235.

In some examples, the UE 215 may determine a beam 230 to use for communication based on monitoring for a broadcast message from the satellite 220. For example, the satellite 220 may broadcast one or more SSBs to one or more UEs 215. The UE 215 may detect an SSB, which may include a master information block (MIB), a SIB (e.g., a first type of SIB (SIB1)), or both. The UE 215 may decode the MIB to identify one or more parameters which may be used to detect and decode the SIB1. For example, the one or more parameters may include a bandwidth, a control resource set (CORESET), a search space, other parameters related to resource allocation, or a combination associated with the SIB1. In some examples, the SIB1 may include location information (e.g., a pointer) corresponding to a second type of SIB (SIB2). The SIB2 may include one or more configurations for BWPs associated with a beam 230 used for communication with the network entity 220. Additionally or alternatively, the UE 215 may receive RRC signaling indicating the one or more configurations for the BWPs associated with the beam 230.

Due to the high mobility of the UE 215 relative to the network entity 220, the UE 215 may frequently switch BWPs associated with one or more beams 230. As illustrated in FIG. 2, the UE 215 may traverse seven different beam footprints 235, and may perform multiple BWP switching operations based on traversing across the beam footprints 235. For example, the UE 215 may perform a BWP switching operation to switch from BWPs associated with beam 230-*a*, beam 230-*b*, or both based on a BWP configuration and the trajectory of the UE 215. Additionally or alternatively, the UE 215 may switch to a different cell based on traversing the beam footprints 235. For example, the beam footprints 235 associated with beam 230-*a*, beam 230-*b*, and beam 230-*c* may be associated with a first cell, however the other beam footprints 235 may be associated with different cells. Additionally or alternatively, beam footprints 235 associated with beam 230-*a*, beam 230-*b*, and beam 230-*c* may be associated with different cells.

In some cases, a UE 215 may switch beams 230 within a coverage area of a network entity 220 or when moving from a first coverage area to a second coverage area. For example, the UE 215 may move from a beam footprint 235 associated with beam 230-*a* to a beam footprint 235 associated with beam 230-*b*. In such examples, the UE 215 may be communicating with network entity 220 on BWP 2, and may switch from beam 230-*a* to beam 230-*b* upon crossing into the beam footprint 235 for beam 230-*b*. Because of the beam switch, the UE 215 may also switch from BWP 2 to BWP 1. Similarly, the UE 215 may switch from beam 230-*b* to another beam 230. The beam switch may be a result of movement by the UE 215, movement or handover by a network entity 220, or a combination thereof. In some examples, the UE 215 may switch from beam 230-*a* to beam 230-*b* based on a beam selection or beam refinement procedure, or based on detected interference or degraded signal quality on beam 230-*a*.

In some cases, the UE 215 may use multiple BWP configurations 240 corresponding to BWPs associated with a new beam in a BWP switching procedure, which may cause high signaling volume and inefficient resource allocation at the UE 215 (e.g., due to BWP configuration signaling in cell search operations). In some examples, the UE 215 may receive one or more configurations for BWPs from a network entity 220 (e.g., after performing a beam switching operation from beam 230-*a* to beam 230-*b*). The UE 215 may receive BWP configurations corresponding to BWPs in beam 230-*a*, BWPs in a different beam 230, such as beam 230-*b*, or BWPs in a beam 230 from a different network entity 220. The BWP configuration may include a frequency shift (e.g., based on a reference BWP) or a time delay associated with the BWP switching procedure.

Figure 3:
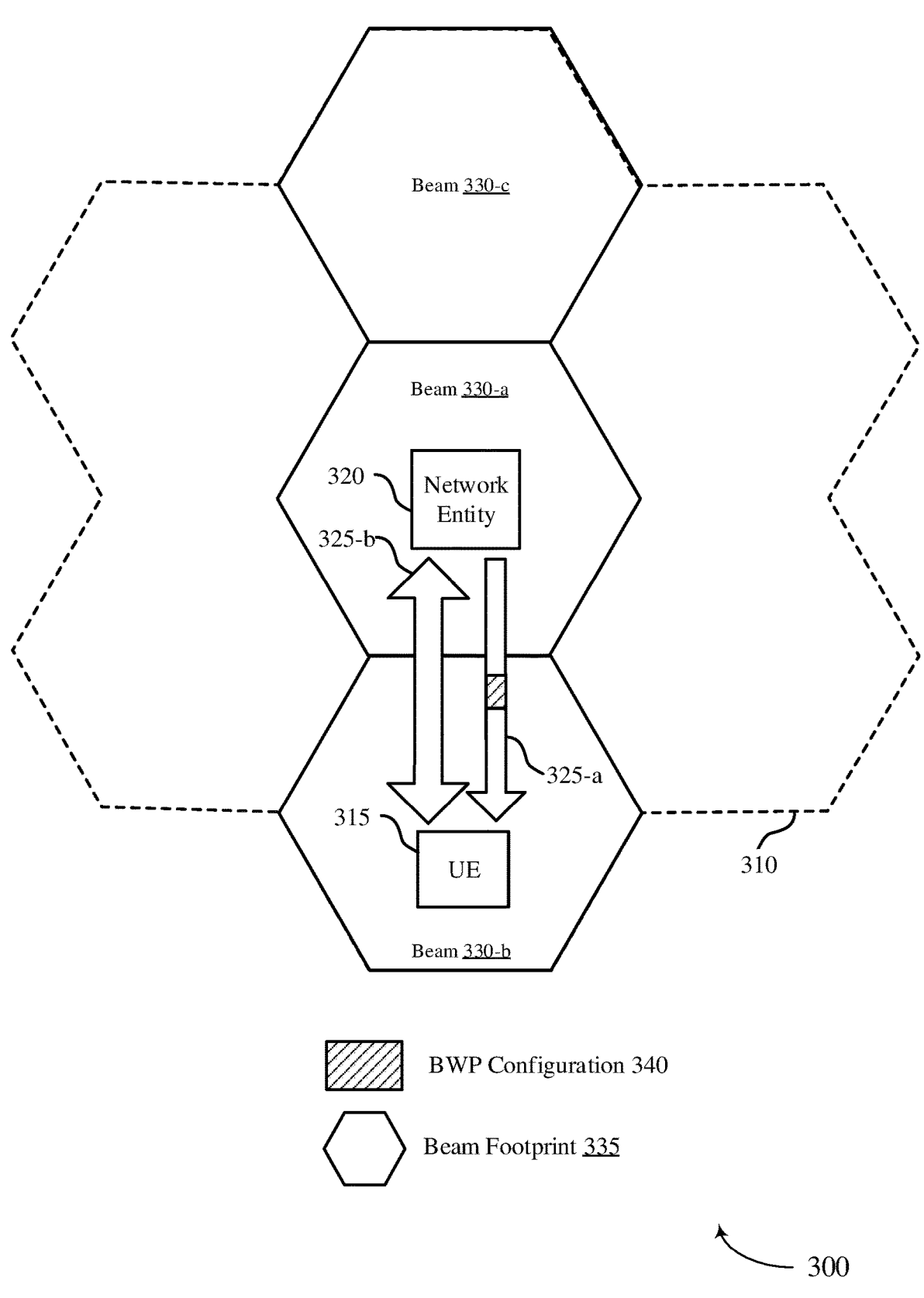

FIG. 3 illustrates an example of a wireless communications system 300 that supports BWP configuration for communication networks in accordance with aspects of the present disclosure. In some examples, wireless communications system 300 may implement aspects of wireless communication system 100, wireless communication system 200, or both. The wireless communications system 300 may include a network entity 320, a UE 315, beams 330, beam footprints 335, and communication links 325, which may be an example of a UE 115, a UE 215, a network entity 220, beams 230, beam footprints 235, and communication links 125 as described with respect to FIGS. 1 and 2, respectively. The network entity 320 may be a satellite (e.g., satellite 120 of FIG. 1), but the network entity may be an example of a base station 105 as described with respect to FIG. 1. The network entity 320 may also be an example of a low earth orbit satellite 120 or other type of satellite 120. As such, the wireless network 300 may be an example of an NTN, a terrestrial network, or a combination of an NTN and terrestrial network.

In some cases, the coverage area 310 of network entity 320 may be include multiple beam footprints 335 corresponding to one or more beams 330 configured at the network entity 320 for communicating with one or more UEs 315. For example, the network entity 320 may use multiple antennas to form one or more beams 330 (e.g., narrow beams) for communication with one or more UEs 315. The beams 330 may operate on different frequency intervals (e.g., different BWPs) to reduce interference among the beams 330. That is, beam 330-*a* may operate using different BWPs than beam 330-*b*. In some examples, the network entity 320 may communicate with the UE 315 via one or more communication links 325 using the beam 330. For example, the network entity 320 may transmit a message including control information to the UE 315 via communication link 325-*a*, which may be used for downlink communications, while the UE 315 and the network entity may communicate using communication link 325-*b*, which may be used for uplink or downlink communications. The network entity 320 and the UE 315 may use beam 330-*a* for both uplink and downlink communications.

The network entity 320 and the UE 315 may be thousands of kilometers apart and it may take some time for electromagnetic waves to propagate over the distance between the network entity 320 and the UE 315. The propagation delay for NTNs may be many orders of magnitude larger than the propagation delay for terrestrial networks. By way of example, the network entity 320 may be in an orbit, such as low earth orbit, medium earth orbit, other non-geostationary earth orbit, or geostationary earth orbit. In any of these examples, the network entity 320 may be many thousands of kilometers from earth, and therefore may be thousands of kilometers from the UE 315. Each transmission via a communication link 325 between the network entity 320 and the UE 315 (e.g., communication link 325-*a*, communication link 325-*b*, or both) may therefore travel from earth the distance to the network entity 320 and back to earth. The distance that a transmission travels may result in substantial signal degradation due to, for example, atmospheric effects, interference from other radio frequency sources, signal attenuation due to vegetation or structures, and the like.

Further, due to the high mobility of the UE 315 relative to the network entity 320, the UE 315 may frequently switch BWPs associated with one or more beams 330. For example, the UE 315 may perform a BWP switching operation to switch from BWPs associated with beam 330-*a*, beam 330-*b*, or both based on a BWP configuration 340. In some examples, the BWP configuration 340 may include information such as a frequency location and bandwidth, a subcarrier spacing, a cyclic prefix duration, a control resource set (CORESET), a search space for a downlink control channel (e.g., a physical downlink control channel (PDCCH)), a time-domain resource allocation for a downlink shared channel (e.g., a starting time and duration for a physical downlink shared channel (PDSCH)), or a combination. The information in the BWP configuration may take up a relatively large number of bits in a message. In some cases, the UE 315 may use multiple BWP configurations 340 corresponding to BWPs associated with a new beam in the beam switching procedure, which may cause high signaling volume and inefficient resource allocation at the UE 315 (e.g., due to BWP configuration signaling in cell search operations).

In some examples, the UE 315 may receive one or more configurations for BWPs from a network entity 320 (e.g., after performing a beam switching operation from beam 330-*a* to beam 330-*b*). For example, the UE 315 may receive a BWP configuration 340 from the network entity 320 via communication link 325-*a*. The UE 315 may receive BWP configurations corresponding to BWPs in beam 330-*a*, BWPs in a different beam 330, such as beam 330-*b*, or BWPs in a beam 330 from a different network entity 320. The network entity 320 may send the bandwidth part configuration 340 using a SIB1, another SIB, or an RRC message.

In some cases, the BWPs may be initial BWPs. For example, the network entity 320 may configure multiple initial downlink BWPs, multiple initial uplink BWPs, or both for each cell, where each cell may include one or more beams 330. Each beam 330 may have an initial downlink BWP and an initial uplink BWP, but may share an initial downlink BWP, an initial uplink BWP, or both with another beam 330. For example, beam 330-*b* may share initial BWPs with beam 330-*c* with relatively low interference (e.g., because beam 330-*b* and beam 330-*c* are relatively far apart).

In some cases, the BWP configuration 340 may include a BWP configuration 340 for each BWP associated with beam 330-*b*. In some other cases, the BWP configuration 340 (e.g., including a downlink BWP or an uplink BWP configuration) may correspond to a reference BWP. In some cases, the reference BWP may be within beam 330-*a*. For example, a downlink BWP, an uplink BWP, or both of beam 330-*a* may be configured with reference to another downlink BWP, another uplink BWP, or both of beam 330-*a*. Additionally or alternatively, the reference BWP may be associated within a different beam 330 (e.g., beam 330-*b*). In some cases, the different beam may be from the network entity 320 illustrated in FIG. 2 or another network entity 320. That is, one or more BWPs associated with beam 330-*a* from the network entity 320 may be configured with reference to another BWP associated with a beam 330 from a different network entity 320. In some examples, the network entity 320 may determine a downlink BWP has IEs that are the same as IEs corresponding to a reference downlink BWP. The network entity 320 may refrain from transmitting the IEs to the UE 315 in the BWP configuration 340 and may indicate an identifier of the reference downlink BWP, and may additionally indicate which IEs are the same.

In some cases, the network entity 320 may indicate a frequency shift corresponding to downlink BWPs associated with beam 330-*b* and a reference downlink BWP (e.g., the difference in frequency between the downlink BWPs associated with beam 330-*b* and the reference downlink BWP), the identifier of the reference downlink BWP, or both. For example, the network entity 320 may indicate that the BWPs associated with beam 330-*b* is obtained by shifting one or more reference BWPs in the BWP configuration 340 by a frequency. Additionally or alternatively, the network entity 320 may configure the initial BWPs (e.g., an uplink BWP, a downlink BWP, or both) for beam 330-*a*, and may use this configuration as a reference to configure the initial BWPs for one or more other beams 330 (e.g., beam 330-*b*) by a frequency shift. For example, the UE 315 may apply the frequency shift to the reference initial BWPs to derive the initial BWPs for a new beam 330. The network entity 320, the UE 315, or both may identify a beam 330 by an SSB index, a cell identifier, or a beam identifier. The UE 315 may identify the network entity 320 (e.g., a satellite) by a cell identifier or a satellite identifier.

In some examples, the BWP configuration 340 may configure multiple BWPs according to the frequency shift. For example, the network entity 320 may transmit a frequency shift indicator, an indication of the one or more reference BWPs, or both via DCI, a MAC-CE, or RRC signaling. In some cases, the network entity 320 may include the frequency shift indicator, the indication of the one or more reference BWPs, or both in the BWP configuration 340. In some examples, the frequency shift indicator may include an integer that corresponds to a frequency shift when multiplied by a frequency unit, a beam identifier from which the UE 315 may derive the frequency shift, an SSB index (e.g., if the SSBs are transmitted on frequency intervals for respective beams 330), or a combination. In some cases, the indication of the one or more reference BWPs may include BWP identifiers of the reference BWPs in the same beam 330 (e.g., beam 330-*b*), BWP identifiers of the reference BWPs in a different beam 330 (e.g., beam 330-*a*), a beam identifier of the different beam 330, or a combination. In some cases, the UE 315 may apply the frequency shift (e.g., indicated in the BWP configuration 340) to the one or more reference BWPs to derive new BWPs (e.g., BWPs associated with beam 330-*b*, beam 330-*a*, or both if the UE 315 switches BWPs).

In some examples, the network entity 320 may transmit an indication to the UE 315 that the BWPs associated with the BWP configuration are independently configured or are configured with reference to one or more other BWPs (e.g., associated with the same beam 330 or a different beam 330). In some cases, the network entity 320 may include the indication in BWP configuration 340. In some other cases, the network entity 320 may include the indication in a separate message, and may transmit the message via communication link 325-*a*.

In some cases, the UE 315 may switch from one or more old BWPs to one or more new BWPs within a BWP switch delay. For example, the UE 315 may switch from an old initial BWP to a new initial BWP within a switch delay. In some examples, the BWP switch delay may be based on a UE capability, a subcarrier spacing, a difference between the old BWPs and the new BWPs, or a combination. For example, the duration of the BWP switch delay may depend on the difference in frequency, subcarrier spacing, cyclic prefix duration, CORESET, search space, or the like, between the old BWPs and the new BWPs. In some cases, if the old BWPs and the new BWPs differ in frequency, the switch delay may be relatively short when compared with the switch delay if the BWPs differ in multiple parameters (e.g., subcarrier spacing, cyclic prefix duration, CORESET, search space, or the like). In some examples, the UE 315 may be configured with multiple values for the BWP switch delay based on subcarrier spacing. In some cases, the network entity 320 may indicate the configuration for the BWP switch delay to the UE 315 in the BWP configuration 340. In some other examples, the configuration for the BWP switch delay may be inferred by the UE 315 and the network entity 320 based on a rule that maps a BWP switching operation into one or more groups, each group representing a level of difference in the BWPs involved in the BWP switching operation.

In some examples, the network entity 320 and the UE 315 may communicate via communication link 325-*b* based on the BWP configuration 340 or the BWP switching operation using one or more BWPs associated with beam 330-*b*.

Figure 4:
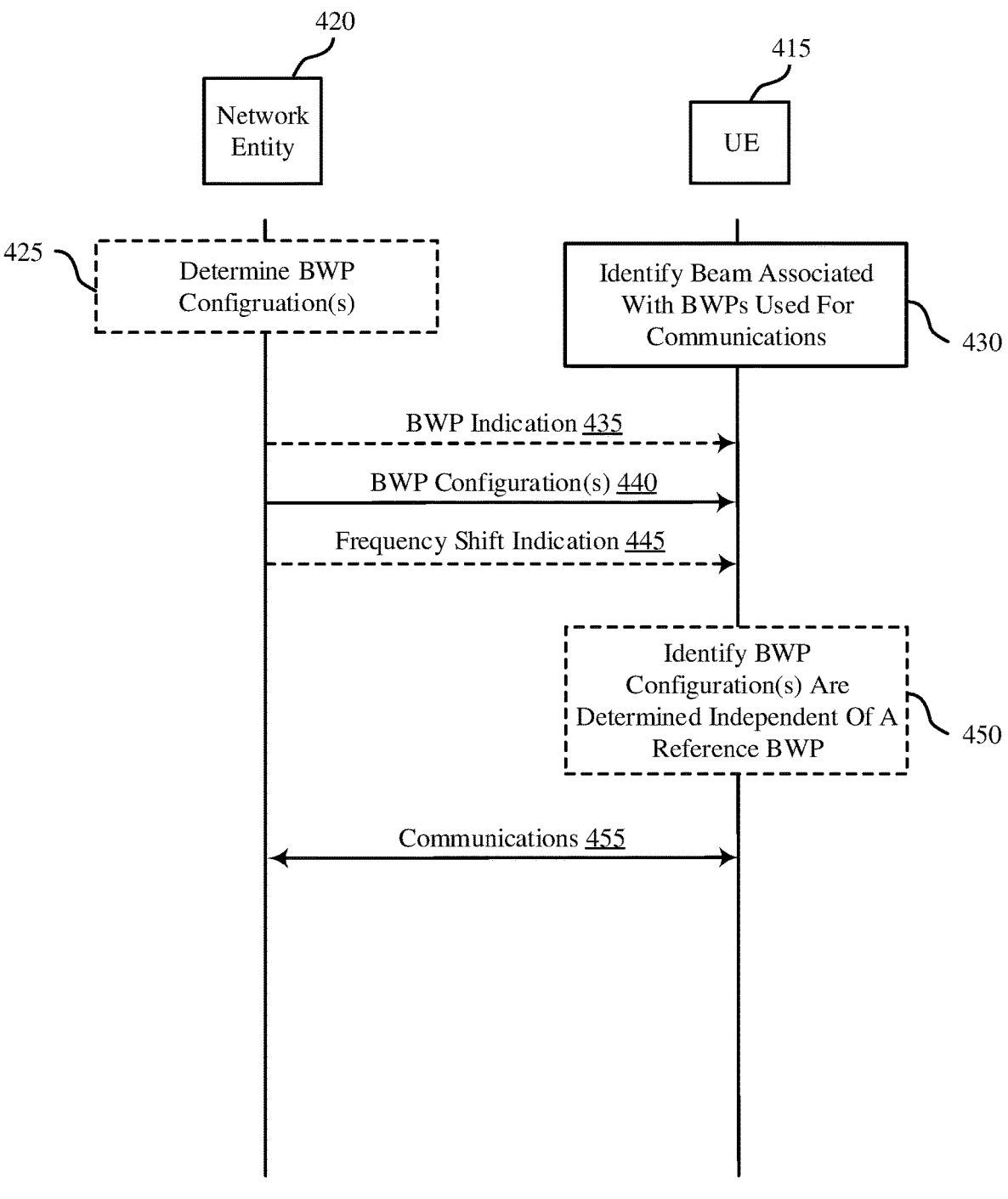
FIGS. 4 and 5 illustrate examples of process flows that supports BWP configuration for communication networks in accordance with aspects of the present disclosure.

FIG. 4 illustrates an example of a process flow 400 that supports BWP configuration for communication networks in accordance with aspects of the present disclosure. In some examples, process flow 400 may implement aspects of wireless communication system 100 or 200. The process flow 400 may illustrate an example of a BWP configuration procedure at a UE 415 and a network entity 420. Alternative examples of the following may be implemented, where some processes are performed in a different order than described or are not performed at all. In some cases, processes may include additional features not mentioned below, or further processes may be added.

At 425, the network entity 420 may determine one or more BWP configurations. For example, the network entity 420 may determine a BWP configuration for each BWP of the multiple BWPs independent of the reference BWP. In some other examples, the network entity 420 may determine one or more BWP configurations independent of the reference BWP.

At 430, the UE 415 may identify a beam used for communicating with a network entity 420. In some cases, the beam may be associated with multiple BWPs including a reference BWP with a reference frequency. In some examples, the UE 415 may identify an SSB index, a cell identifier, a beam identifier, or a combination.

At 435, the network entity 420 may transmit an indication that a BWP configuration is determined independent of the reference BWP. The indication may correspond to the BWP configuration. In some cases, the UE 415 may receive an indication of the reference BWP from the network entity 420, the indication may include a BWP identifier, a beam identifier, or both.

At 440, the UE 415 may receive one or more BWP configurations for the plurality of BWPs. In some cases, the BWP configuration may be based on changing a frequency for at least one BWP of the multiple BWPs from the reference frequency to a different frequency. In some examples, the UE 415 may receive the BWP configuration based on receiving the indication at 435. In some cases, the multiple BWPs may be downlink BWPs, uplink BWPs, or both. In some cases, a BWP of the multiple BWPs may be an initial BWP. In some examples, the UE 415 may receive a BWP configuration for a set of the multiple BWPs on the beam. The set of BWPs may include uplink BWPs, downlink BWPs, or both. In some cases, the UE 415 may receive a first BWP configuration for a first set of the multiple BWPs on a first beam and a second BWP configuration for a second set of the multiple BWPs on a second beam different than the first beam. The UE 415 may determine the second BWP configuration is based on the reference BWP, the second set including the reference BWP. The UE 415 or the network 420 may determine a first IE associated with the reference BWP is the same as a second IE associated with a BWP in the second set. The second BWP configuration may include an identifier corresponding to the reference BWP. In some cases, the second beam may be used for communicating with the network entity 420 or a different network entity. In some cases, the network entity 420 may transmit the one or more BWP configurations via RRC signaling, a SIB, or both.

At 445, the UE 415 may receive an indication of the difference between the reference frequency and a different frequency (e.g., a frequency shift), the different frequency may be associated with the second set of the multiple BWPs. In some cases, the indication may include an integer multiplier, a beam identifier, an SSB index, or a combination.

At 450 the UE 415 may identify a BWP configuration for each BWP of the multiple BWPs is determined independent of the reference BWP (e.g., based on the indication at 435). The UE 415 may receive the BWP configuration for each BWP of the multiple BWPs. In some cases, the UE 415 may receive a configuration corresponding to a mapping of the indication to the frequency shift.

At 455, the UE 415 and the network entity 420 may communicate according to the one or more BWP configurations. The network entity 420 and the UE 415 may be associated with an NTN.

Figure 5:
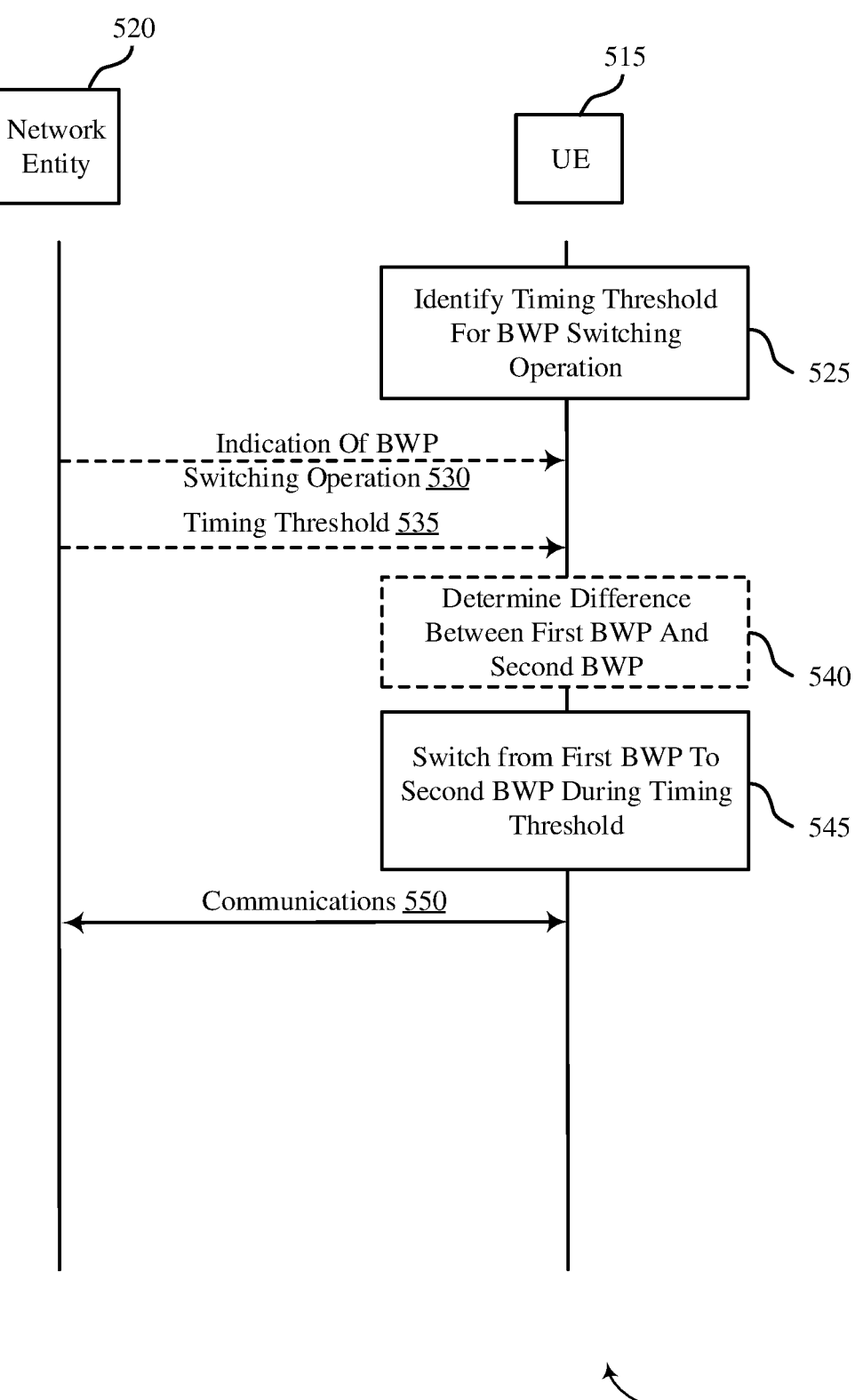

FIG. 5 illustrates an example of a process flow 500 that supports BWP configuration for communication networks in accordance with aspects of the present disclosure. In some examples, process flow 500 may implement aspects of wireless communication system 100 or 200. The process flow 400 may illustrate an example of a BWP configuration procedure at a UE 515 and a network entity 520. Alternative examples of the following may be implemented, where some processes are performed in a different order than described or are not performed at all. In some cases, processes may include additional features not mentioned below, or further processes may be added.

At 525, UE 515 may identify a timing threshold (i.e., a switch delay) associated with a BWP switching operation for multiple BWPs associated with a beam used for communicating with the network entity 520. The BWP switching operation may include switching from a first BWP to a second BWP of the multiple BWPs. In some cases, a BWP of the multiple BWPs may be an initial BWP.

At 530, the network entity 520 may transmit an indication to perform the BWP switching operation to the UE 515. At 535, the network entity 520 may transmit an indication of the timing threshold associated with the BWP switching operation.

At 540, the UE 515, the network entity 520, or both may determine a first difference between the frequencies associated with the first BWP and second BWP, a second difference between the parameters associated with the first BWP and the second BWP, or both. In some cases, the parameters may include a subcarrier spacing, a cyclic prefix duration, a CORESET, a search space, or a combination. The timing threshold may be based on the first difference and the second difference. For example, the timing threshold may be greater based on the second difference (e.g., if there is a difference in parameters and frequency).

At 545, the UE 515 may switch from the first BWP to the second BWP during the timing threshold. Switching from the first BWP to the second BWP may be based on the indication from 530.

At 550, the UE 515 and the network entity 520 may communicate according to the second BWP based on the switching operation. In some cases, the UE 515 and the network entity 520 may be associated with an NTN.

Figure 6:
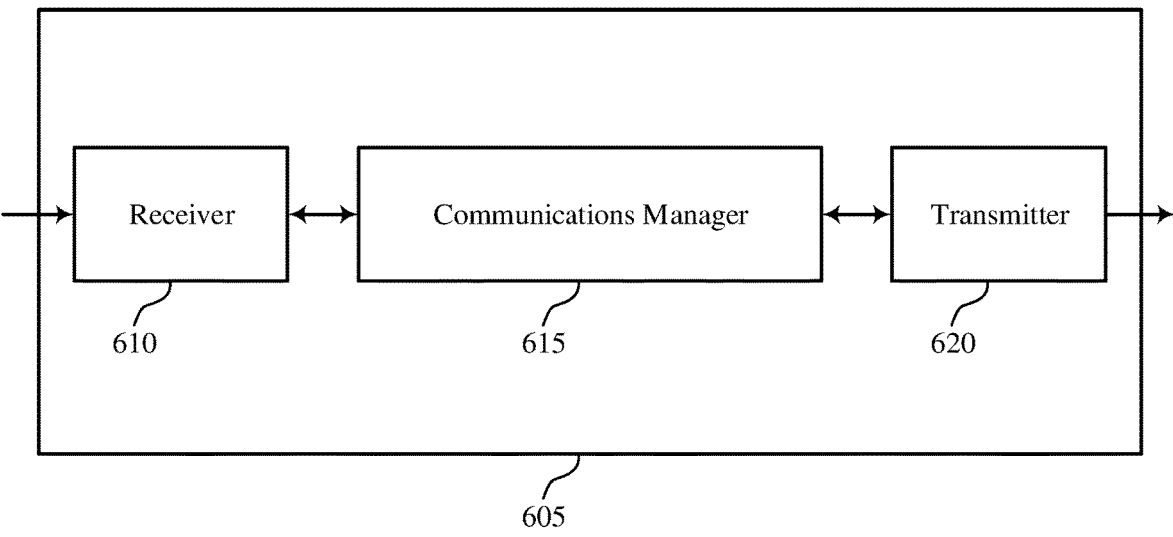
FIGS. 6 and 7 show block diagrams of devices that support BWP configuration for communication networks in accordance with aspects of the present disclosure.

FIG. 6 shows a block diagram 600 of a device 605 that supports BWP configuration for communication networks in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to BWP configuration for communication networks, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a beam used for communicating with a network entity, the beam associated with a set of BWPs including a reference BWP with a first frequency, receive a BWP configuration for the set of BWPs, the BWP configuration based on changing a frequency for at least one BWP of the set of BWPs from the first frequency to a second frequency, and communicate with the network entity according to the BWP configuration. The communications manager 615 may also identify a timing threshold associated with a BWP switching operation for a set of BWPs associated with a beam used for communicating with a network entity, the BWP switching operation including switching from a first BWP of the set of BWPs to a second BWP of the set of BWPs, switch from the first BWP of the set of BWPs to the second BWP of the set of BWPs during the timing threshold, and communicate with the network entity according to the second BWP based on the switching. The communications manager 615 may be an example of aspects of the communications manager 910 described herein.

The actions performed by the communications manager 615 as described herein may support improvements in communications. In one or more aspects, a UE may receive one or more BWP configurations for communicating with a network entity. Receiving the BWP configurations may enable techniques for reducing signaling overhead in the system by improving the efficiency of beam switching operations. For example, the UE may use a frequency shift or a switch delay signaled in the BWP configurations to determine a BWP to switch to for communications with the network entity.

Based on receiving the one or more BWP configurations as described herein, a processor of a UE (e.g., a processor controlling the receiver 610, the communications manager 615, the transmitter 620, or a combination thereof) may improve communication efficiency in the system. For example, the BWP switching techniques described herein may leverage an indicator from the network entity including a BWP configuration information, which may realize reduced signaling overhead and power savings (e.g., by reducing cell search operations), among other benefits.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field-programmable gate-array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
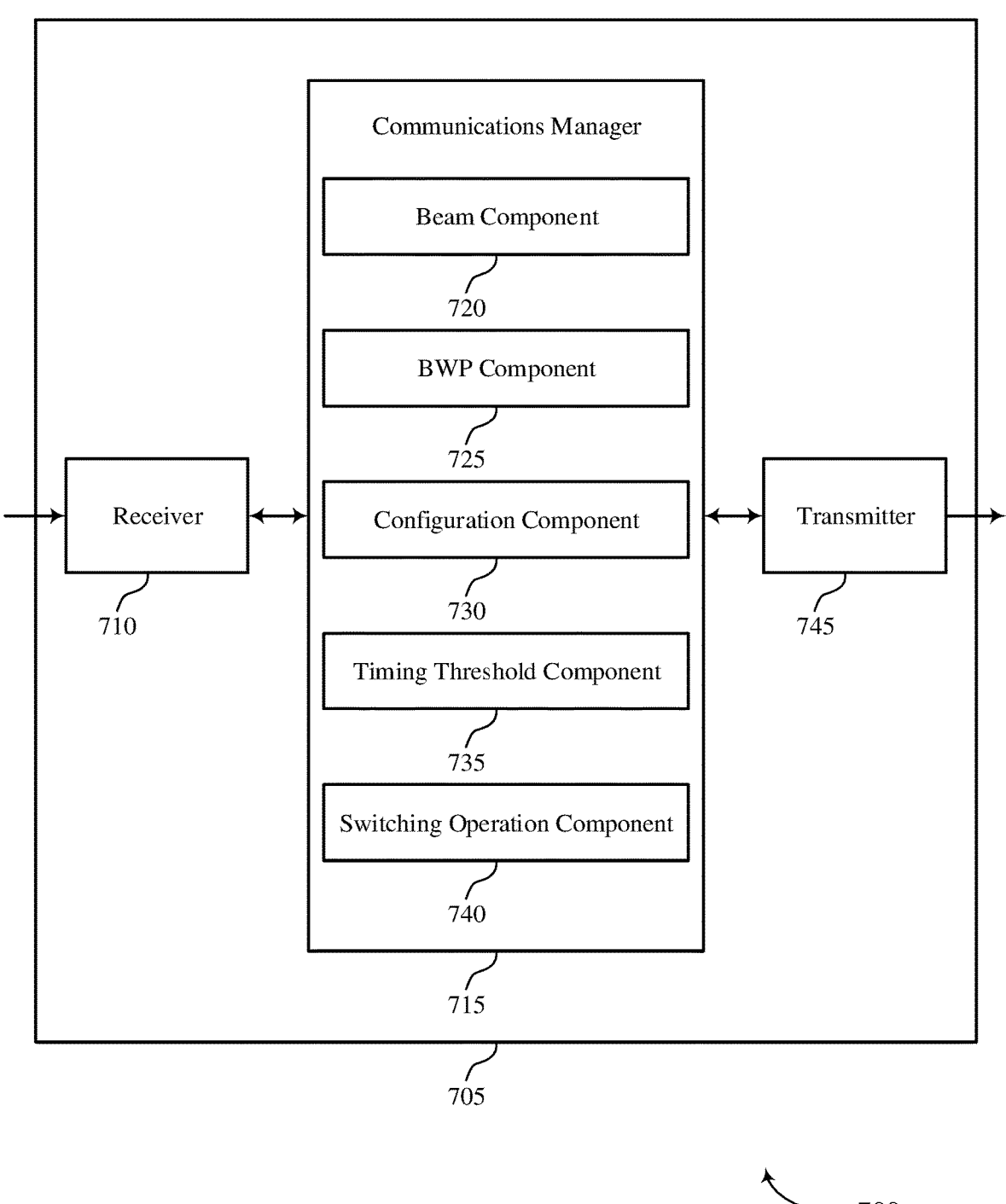

FIG. 7 shows a block diagram 700 of a device 705 that supports BWP configuration for communication networks in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to BWP configuration for communication networks, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a beam component 720, a BWP component 725, a configuration component 730, a timing threshold component 735, and a switching operation component 740. The communications manager 715 may be an example of aspects of the communications manager 910 described herein.

The beam component 720 may identify a beam used for communicating with a network entity, the beam associated with a set of BWPs including a reference BWP with a first frequency. The BWP component 725 may receive a BWP configuration for the set of BWPs, the BWP configuration based on changing a frequency for at least one BWP of the set of BWPs from the first frequency to a second frequency. The configuration component 730 may communicate with the network entity according to the BWP configuration.

The timing threshold component 735 may identify a timing threshold associated with a BWP switching operation for a set of BWPs associated with a beam used for communicating with a network entity, the BWP switching operation including switching from a first BWP of the set of BWPs to a second BWP of the set of BWPs. The switching operation component 740 may switch from the first BWP of the set of BWPs to the second BWP of the set of BWPs during the timing threshold. The BWP component 725 may communicate with the network entity according to the second BWP based on the switching.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
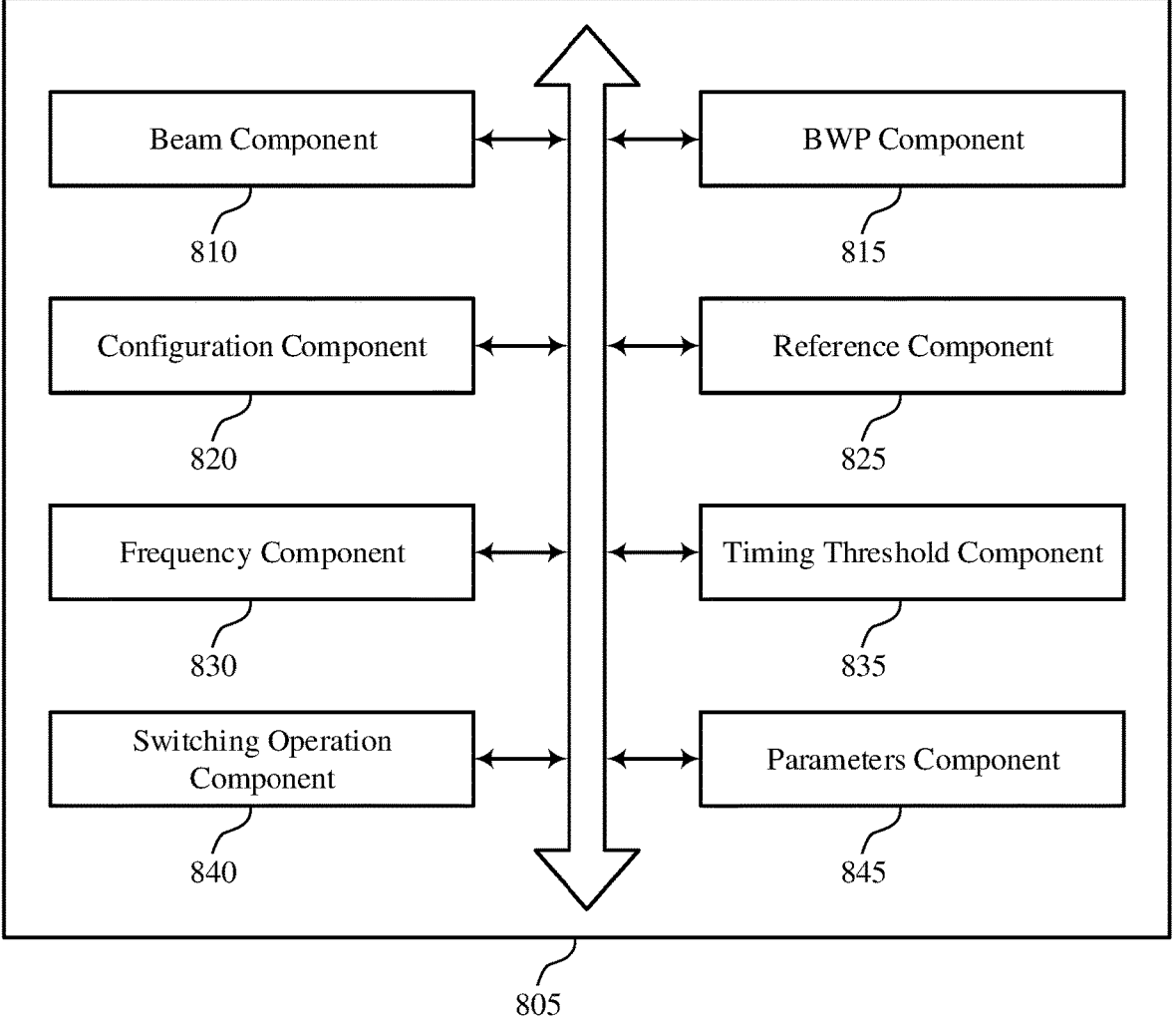
FIG. 8 shows a block diagram of a communications manager that supports BWP configuration for communication networks in accordance with aspects of the present disclosure.

FIG. 8 shows a block diagram 800 of a communications manager 805 that supports BWP configuration for communication networks in accordance with aspects of the present disclosure. The communications manager 805 may be an example of aspects of a communications manager 615, a communications manager 715, or a communications manager 910 described herein. The communications manager 805 may include a beam component 810, a BWP component 815, a configuration component 820, a reference component 825, a frequency component 830, a timing threshold component 835, a switching operation component 840, and a parameters component 845. Each of these modules may communicate, directly or indirectly, with one another (e.g., via one or more buses).

The beam component 810 may identify a beam used for communicating with a network entity, the beam associated with a set of BWPs including a reference BWP with a first frequency. In some examples, the beam component 810 may identify an SSB index, a cell identifier, a beam identifier, or a combination thereof.

The BWP component 815 may receive a BWP configuration for the set of BWPs, the BWP configuration based on changing a frequency for at least one BWP of the set of BWPs from the first frequency to a second frequency. In some cases, the set of BWPs are downlink BWPs, uplink BWPS, or both. In some cases, a BWP of the set of BWPs is an initial BWP. In some examples, the configuration component 820 may identify a BWP configuration for each BWP of the set of BWPs is determined independent of the reference BWP. In some examples, the configuration component 820 may receive the BWP configuration for the each BWP of the set of BWPs. In some examples, the configuration component 820 may receive, from the network entity, an indication that the BWP configuration is determined independent of the reference BWP, where receiving the BWP configuration for each BWP of the set of BWPs is based on the received indication.

In some examples, the configuration component 820 may receive a BWP configuration for a set of the set of BWPs on the beam. In some examples, the configuration component 820 may receive a first BWP configuration for a first set of the set of BWPs on a first beam, the first beam used for communicating with the network entity. In some examples, the configuration component 820 may receive a second BWP configuration on a second beam, the second beam different than the first beam. The reference component 825 may determine that the second BWP configuration is for a second set of the set of BWPs associated with the second beam and is based on the reference BWP, the first set of the set of BWPs including the reference BWP.

In some examples, the configuration component 820 may receive, from the network entity, an indicator corresponding to the BWP configuration, where receiving the second BWP configuration on the second beam is based on the received indicator. In some cases, the network entity is a first network entity and the second beam is used for communicating with a second network entity different from the first network entity. In some cases, the second beam is used for communicating with the network entity. In some examples, the configuration component 820 may receive the BWP configuration via an RRC signaling message, a SIB, or both. In some examples, the reference component 825 may receive, from the network entity, an indication of the reference BWP including a BWP identifier, a beam identifier, or both.

In some examples, the reference component 825 may determine a first information element associated with the reference BWP is the same as a second information element associated with a BWP in the second set of the set of BWPs, where the second BWP configuration includes an identifier corresponding to the reference BWP. In some examples, the reference component 725 may make the determination based on the absence of the second information element associated with the BWP in the second set of the set of BWPs. In some examples, the reference component 725 may make the determination based on an indicator that indicates which information elements associated with the BWP in the second set of the set of BWPs are the same as the reference BWP. In some examples, the reference component 825 may receive, in the second BWP configuration, an indication of a difference between the first frequency and the second frequency and an identifier corresponding to the reference BWP, the second frequency associated with the second set of the set of BWPs. The frequency component 830 may receive, from the network entity, an indication of a difference between the first frequency and the second frequency, the indication including an integer multiplier, a beam identifier, an SSB index, or a combination.

The configuration component 820 may communicate with the network entity according to the BWP configuration. In some cases, the UE and the network entity are associated with an NTN (NTN).

The timing threshold component 835 may identify a timing threshold associated with a BWP switching operation for a set of BWPs associated with a beam used for communicating with a network entity, the BWP switching operation including switching from a first BWP of the set of BWPs to a second BWP of the set of BWPs. In some examples, the timing threshold component 835 may receive, from the network entity, an indication of the timing threshold associated with the BWP switching operation. In some examples, the switching operation component 840 may receive, from the network entity, an indication to perform the BWP switching operation, where switching from the first BWP to the second BWP is based on the indication.

The switching operation component 840 may switch from the first BWP of the set of BWPs to the second BWP of the set of BWPs during the timing threshold. In some examples, the frequency component 830 may determine a first difference between a first frequency associated with the first BWP and a second frequency associated with the second BWP, the timing threshold based on the first difference between the first frequency and the second frequency.

The parameters component 845 may determine a second difference between a first set of parameters associated with the first BWP and a second set of parameters associated with the second BWP, the timing threshold based on the second difference between the first set of parameters and the second set of parameters. In some cases, the first set of parameters and the second set of parameters include a subcarrier spacing, a cyclic prefix duration, a control resource set, a search space, or a combination thereof. In some examples, the frequency component 830 may receive, from the network entity, a configuration corresponding to a mapping of the indication to the difference between the first frequency and the second frequency. In some cases, the timing threshold is greater based on the second difference. In some examples, the BWP component 815 may communicate with the network entity according to the second BWP based on the switching.

Figure 9:
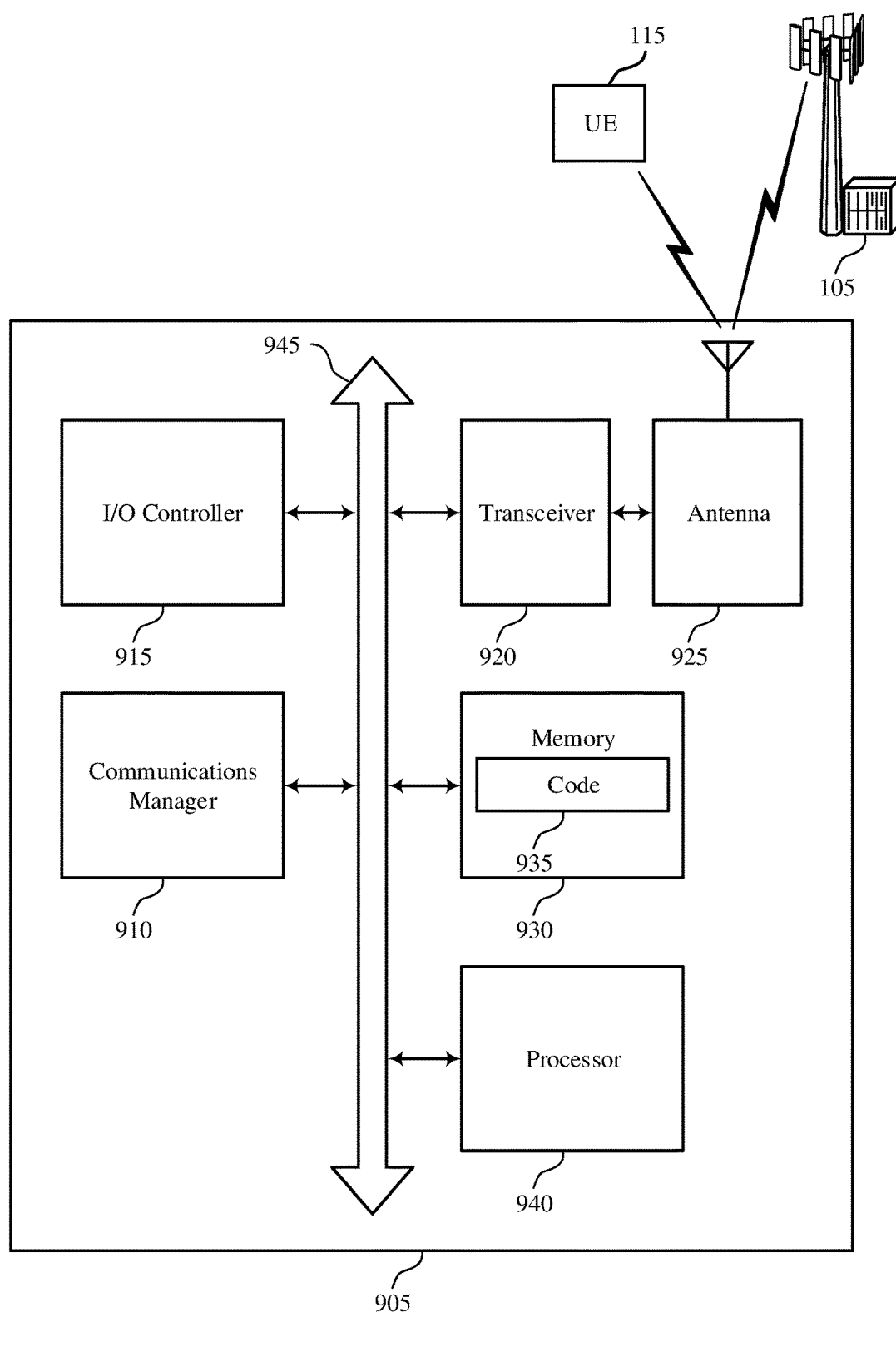
FIG. 9 shows a diagram of a system including a device that supports BWP configuration for communication networks in accordance with aspects of the present disclosure.

FIG. 9 shows a diagram of a system 900 including a device 905 that supports BWP configuration for communication networks in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a beam used for communicating with a network entity, the beam associated with a set of BWPs including a reference BWP with a first frequency, receive a BWP configuration for the set of BWPs, the BWP configuration based on changing a frequency for at least one BWP of the set of BWPs from the first frequency to a second frequency, and communicate with the network entity according to the BWP configuration. The communications manager 910 may also identify a timing threshold associated with a BWP switching operation for a set of BWPs associated with a beam used for communicating with a network entity, the BWP switching operation including switching from a first BWP of the set of BWPs to a second BWP of the set of BWPs, switch from the first BWP of the set of BWPs to the second BWP of the set of BWPs during the timing threshold, and communicate with the network entity according to the second BWP based on the switching.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a digital signal processor (DSP), a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting BWP configuration for communication networks).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
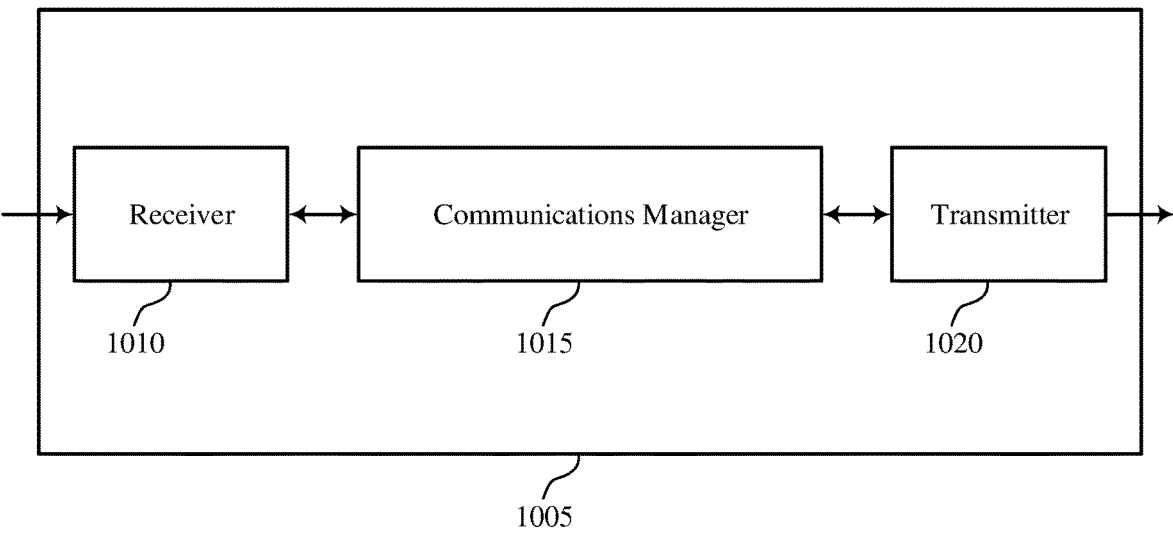
FIGS. 10 and 11 show block diagrams of devices that support BWP configuration for communication networks in accordance with aspects of the present disclosure.

FIG. 10 shows a block diagram 1000 of a device 1005 that supports BWP configuration for communication networks in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to BWP configuration for communication networks, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, an indication of a BWP configuration corresponding to a set of BWPs associated with a beam used for communicating with the UE, the BWP configuration based on changing a frequency for the set of BWPs from a first frequency associated with a reference BWP to a second frequency and communicate with the UE according to the BWP configuration. The communications manager 1015 may also transmit, to a UE, an indication to perform a BWP switching operation for a set of BWPs associated with a beam used for communicating with the UE, the BWP switching operation including switching from a first BWP of the set of BWPs to a second BWP of the set of BWPs during a timing threshold and communicate with the UE according to the second BWP based on transmitting the indication. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
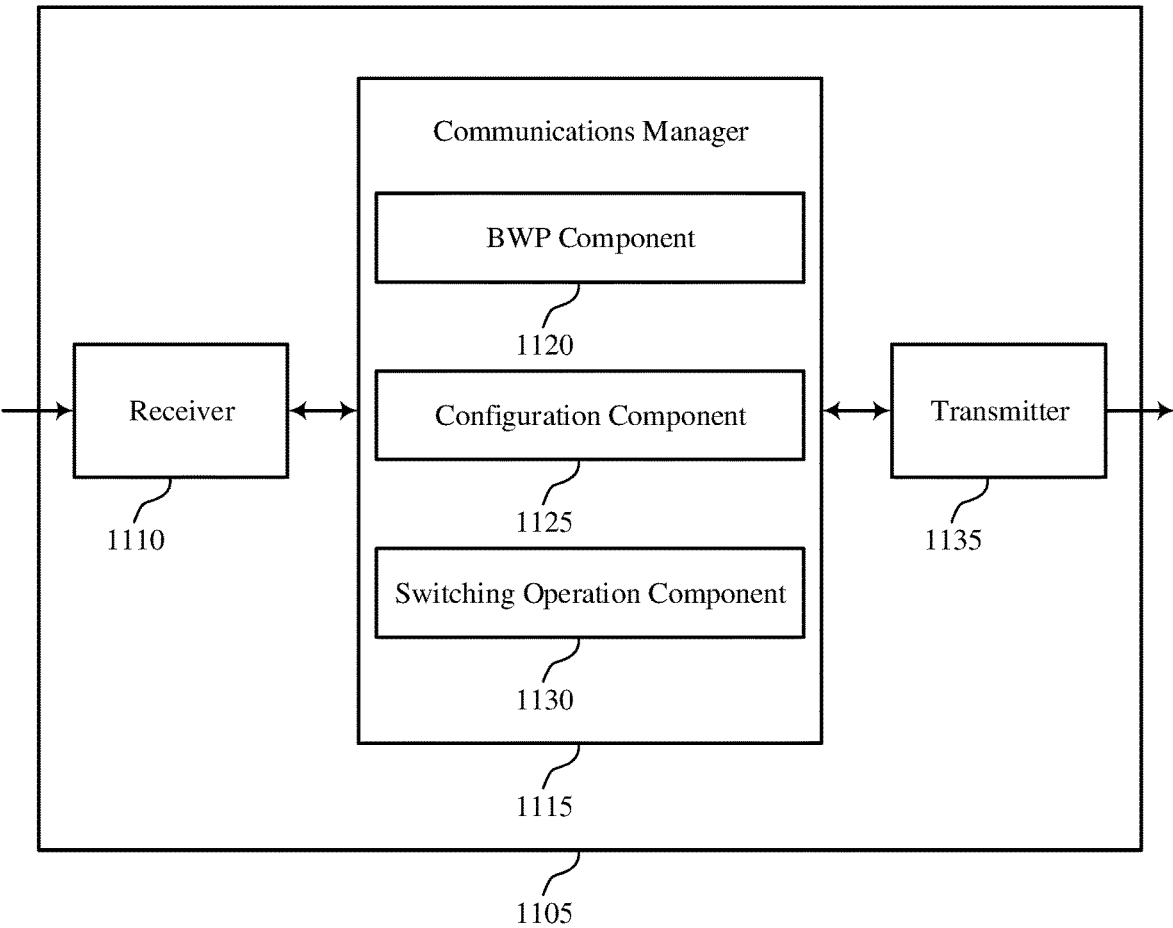

FIG. 11 shows a block diagram 1100 of a device 1105 that supports BWP configuration for communication networks in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to BWP configuration for communication networks, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a BWP component 1120, a configuration component 1125, and a switching operation component 1130. The communications manager 1115 may be an example of aspects of the communications manager 1310 described herein.

The BWP component 1120 may transmit, to a UE, an indication of a BWP configuration corresponding to a set of BWPs associated with a beam used for communicating with the UE, the BWP configuration based on changing a frequency for the set of BWPs from a first frequency associated with a reference BWP to a second frequency. The configuration component 1125 may communicate with the UE according to the BWP configuration.

The switching operation component 1130 may transmit, to a UE, an indication to perform a BWP switching operation for a set of BWPs associated with a beam used for communicating with the UE, the BWP switching operation including switching from a first BWP of the set of BWPs to a second BWP of the set of BWPs during a timing threshold. The BWP component 1120 may communicate with the UE according to the second BWP based on transmitting the indication.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
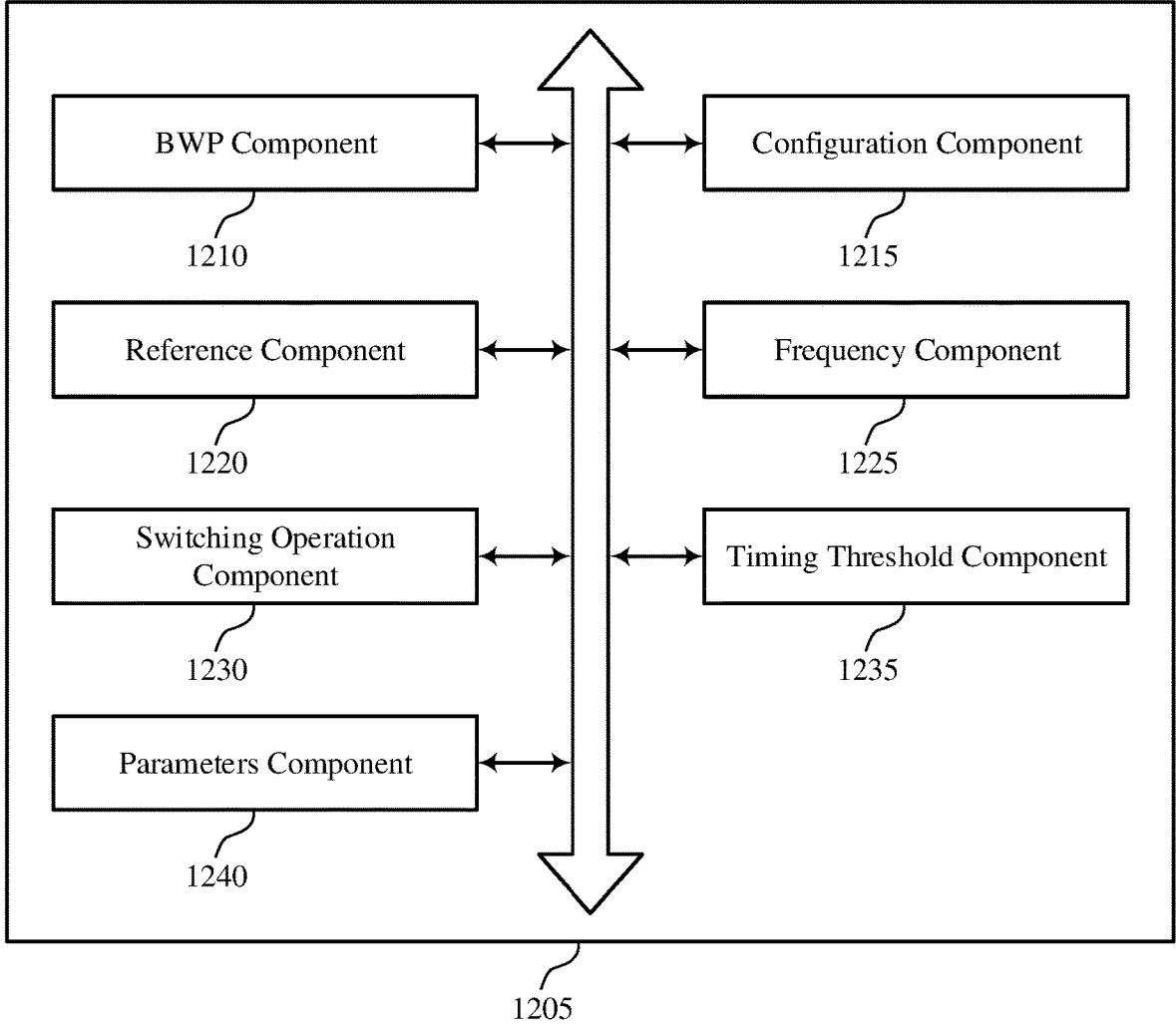
FIG. 12 shows a block diagram of a communications manager that supports BWP configuration for communication networks in accordance with aspects of the present disclosure.

FIG. 12 shows a block diagram 1200 of a communications manager 1205 that supports BWP configuration for communication networks in accordance with aspects of the present disclosure. The communications manager 1205 may be an example of aspects of a communications manager 1015, a communications manager 1115, or a communications manager 1310 described herein. The communications manager 1205 may include a BWP component 1210, a configuration component 1215, a reference component 1220, a frequency component 1225, a switching operation component 1230, a timing threshold component 1235, and a parameters component 1240. Each of these modules may communicate, directly or indirectly, with one another (e.g., via one or more buses).

The BWP component 1210 may transmit, to a UE, an indication of a BWP configuration corresponding to a set of BWPs associated with a beam used for communicating with the UE, the BWP configuration based on changing a frequency for the set of BWPs from a reference BWP to a second frequency. In some cases, the set of BWPs are downlink BWPs, uplink BWPs, or both. In some cases, a BWP of the set of BWPs is an initial BWP. In some cases, the UE and the network entity are associate with an NTN (NTN).

In some examples, the configuration component 1215 may determine a BWP configuration for each BWP of the set of BWPs independent of the reference BWP. In some examples, the configuration component 1215 may transmit the BWP configuration for each BWP of the set of BWPs. In some examples, the configuration component 1215 may transmit a BWP configuration for a set of the set of BWPs on the beam. In some examples, the configuration component 1215 may transmit a first BWP configuration for a first set of the set of BWPs on a first beam, the first beam used for communicating with the UE. In some examples, the configuration component 1215 may transmit a second BWP configuration on a second beam, the second beam different than the first beam.

In some examples, the frequency component 1225 may determine a first difference between a first frequency associated with the first BWP and a second frequency associated with the second BWP, the timing threshold based on the first difference between the first frequency and the second frequency. The frequency component 1225 may transmit, to the UE, an indication of a difference between the first frequency and the second frequency, the indication including an integer multiplier, a beam identifier, an SSB index, or a combination. The parameters component 1240 may determine a second difference between a first set of parameters associated with the first BWP and a second set of parameters associated with the second BWP, the timing threshold based on the second difference between the first set of parameters and the second set of parameters. In some cases, the first set of parameters and the second set of parameters include a subcarrier spacing, a cyclic prefix duration, a control resource set, a search space, or a combination thereof. In some examples, the frequency component 1225 may transmit, to the UE, a configuration corresponding to a mapping of the indication to the difference between the first frequency and the second frequency.

In some examples, the configuration component 1215 may determine that the second BWP configuration is for a second set of the set of BWPs associated with the second beam and is based on the reference BWP, the first set of the set of BWPs including the reference BWP. In some examples, the configuration component 1215 may transmit, to the UE, an indicator corresponding to the BWP configuration, where receiving the second BWP configuration is based on the received indicator. In some examples, the configuration component 1215 may transmit, to the UE, an indication that the BWP configuration is determined independent of the reference BWP, where receiving the BWP configuration for each BWP of the set of BWPs is based on the received indication.

The reference component 1220 may determine a first information element associated with the reference BWP is the same as a second information element associated with a BWP in the second set of the set of BWPs, where the second BWP configuration includes an identifier corresponding to the reference BWP. In some examples, the reference component 1220 may transmit, to the UE, an indication of the reference BWP including a BWP identifier, a beam identifier, or both.

In some examples, the configuration component 1215 may transmit the BWP configuration via an RRC signaling message, a SIB, or both. In some examples, the configuration component 1215 may transmit, in the second BWP configuration, an indication of a difference between the first frequency and the second frequency and an identifier corresponding to the reference BWP, the second frequency associated with the second set of the set of BWPs.

The configuration component 1215 may communicate with the UE according to the BWP configuration.

The switching operation component 1230 may transmit, to a UE, an indication to perform a BWP switching operation for a set of BWPs associated with a beam used for communicating with the UE, the BWP switching operation including switching from a first BWP of the set of BWPs to a second BWP of the set of BWPs during a timing threshold.

The timing threshold component 1235 may transmit, to the UE, an indication of the timing threshold associated with the BWP switching operation. In some cases, the timing threshold is greater based on the second difference. In some examples, the BWP component 1210 may communicate with the UE according to the second BWP based on transmitting the indication.

Figure 13:
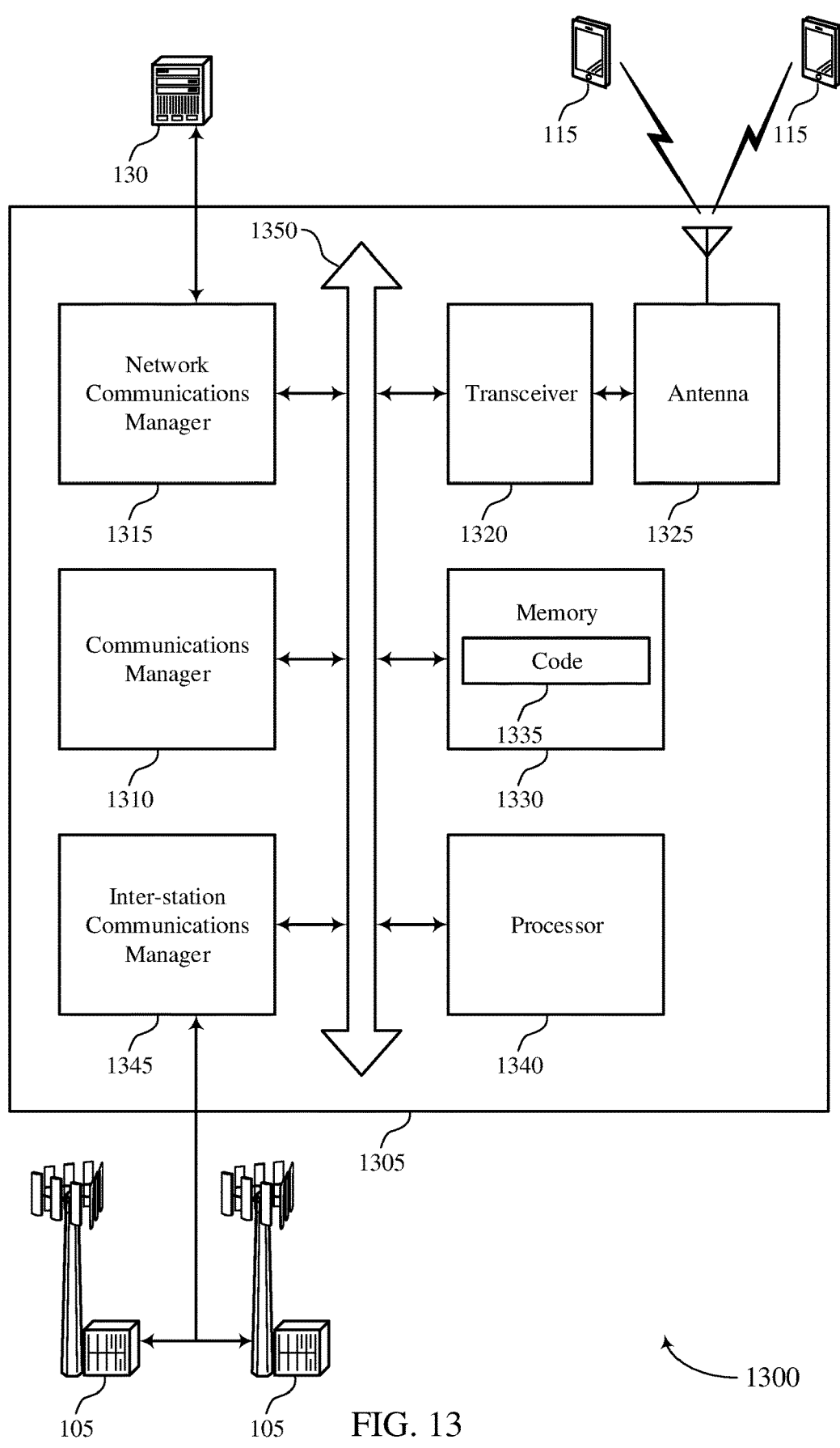
FIG. 13 shows a diagram of a system including a device that supports BWP configuration for communication networks in accordance with aspects of the present disclosure.

FIG. 13 shows a diagram of a system 1300 including a device 1305 that supports BWP configuration for communication networks in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, an indication of a BWP configuration corresponding to a set of BWPs associated with a beam used for communicating with the UE, the BWP configuration based on changing a frequency for the set of BWPs from a first frequency associated with a reference BWP to a second frequency and communicate with the UE according to the BWP configuration. The communications manager 1310 may also transmit, to a UE, an indication to perform a BWP switching operation for a set of BWPs associated with a beam used for communicating with the UE, the BWP switching operation including switching from a first BWP of the set of BWPs to a second BWP of the set of BWPs during a timing threshold and communicate with the UE according to the second BWP based on transmitting the indication.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting BWP configuration for communication networks).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

FIG. 14 shows a flowchart illustrating a method 1400 that supports BWP configuration for communication networks in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may identify a beam used for communicating with a network entity, the beam associated with a set of BWPs including a reference BWP with a first frequency. The operations of 1405 may be performed according to the methods described herein. In some examples, aspects of the operations of 1405 may be performed by a beam component as described with reference to FIGS. 6 through 9.

At 1410, the UE may receive a BWP configuration for the set of BWPs, the BWP configuration based on changing a frequency for at least one BWP of the set of BWPs from the first frequency to a second frequency. The operations of 1410 may be performed according to the methods described herein. In some examples, aspects of the operations of 1410 may be performed by a BWP component as described with reference to FIGS. 6 through 9.

At 1415, the UE may communicate with the network entity according to the BWP configuration. The operations of 1415 may be performed according to the methods described herein. In some examples, aspects of the operations of 1415 may be performed by a configuration component as described with reference to FIGS. 6 through 9.

FIG. 15 shows a flowchart illustrating a method 1500 that supports BWP configuration for communication networks in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify a beam used for communicating with a network entity, the beam associated with a set of BWPs including a reference BWP with a first frequency. The operations of 1505 may be performed according to the methods described herein. In some examples, aspects of the operations of 1505 may be performed by a beam component as described with reference to FIGS. 6 through 9.

At 1510, the UE may a BWP of the set of BWPs is an initial BWP. The operations of 1510 may be performed according to the methods described herein. In some examples, aspects of the operations of 1510 may be performed by a BWP component as described with reference to FIGS. 6 through 9.

At 1515, the UE may receive a BWP configuration for the set of BWPs, the BWP configuration based on changing a frequency for at least one BWP of the set of BWPs from the first frequency to a second frequency. The operations of 1515 may be performed according to the methods described herein. In some examples, aspects of the operations of 1515 may be performed by a BWP component as described with reference to FIGS. 6 through 9.

At 1520, the UE may communicate with the network entity according to the BWP configuration. The operations of 1520 may be performed according to the methods described herein. In some examples, aspects of the operations of 1520 may be performed by a configuration component as described with reference to FIGS. 6 through 9.

FIG. 16 shows a flowchart illustrating a method 1600 that supports BWP configuration for communication networks in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may identify a timing threshold associated with a BWP switching operation for a set of BWPs associated with a beam used for communicating with a network entity, the BWP switching operation including switching from a first BWP of the set of BWPs to a second BWP of the set of BWPs. The operations of 1605 may be performed according to the methods described herein. In some examples, aspects of the operations of 1605 may be performed by a timing threshold component as described with reference to FIGS. 6 through 9.

At 1610, the UE may switch from the first BWP of the set of BWPs to the second BWP of the set of BWPs during the timing threshold. The operations of 1610 may be performed according to the methods described herein. In some examples, aspects of the operations of 1610 may be performed by a switching operation component as described with reference to FIGS. 6 through 9.

At 1615, the UE may communicate with the network entity according to the second BWP based on the switching. The operations of 1615 may be performed according to the methods described herein. In some examples, aspects of the operations of 1615 may be performed by a BWP component as described with reference to FIGS. 6 through 9.

Figure 17:
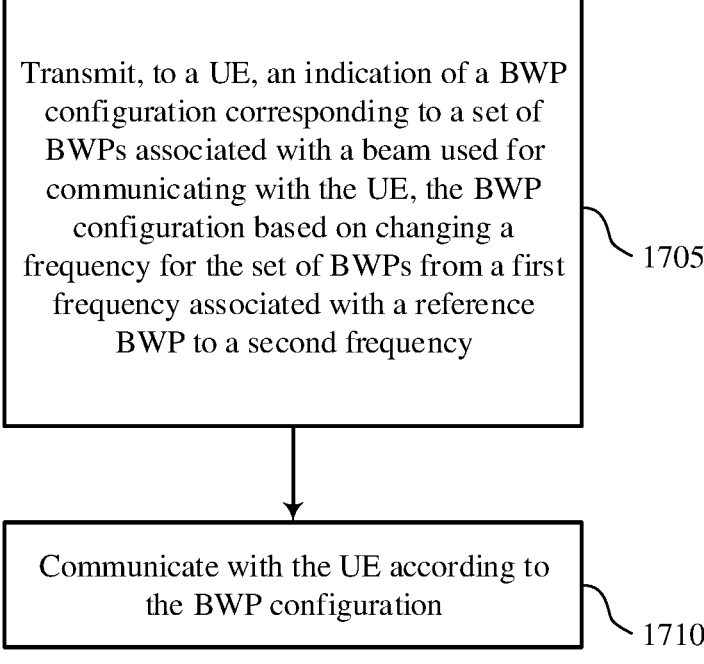

FIG. 17 shows a flowchart illustrating a method 1700 that supports BWP configuration for communication networks in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, an indication of a BWP configuration corresponding to a set of BWPs associated with a beam used for communicating with the UE, the BWP configuration based on changing a frequency for the set of BWPs from a first frequency associated with a reference BWP to a second frequency. The operations of 1705 may be performed according to the methods described herein. In some examples, aspects of the operations of 1705 may be performed by a BWP component as described with reference to FIGS. 10 through 13.

At 1710, the base station may communicate with the UE according to the BWP configuration. The operations of 1710 may be performed according to the methods described herein. In some examples, aspects of the operations of 1710 may be performed by a configuration component as described with reference to FIGS. 10 through 13.

FIG. 18 shows a flowchart illustrating a method 1800 that supports BWP configuration for communication networks in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, an indication to perform a BWP switching operation for a set of BWPs associated with a beam used for communicating with the UE, the BWP switching operation including switching from a first BWP of the set of BWPs to a second BWP of the set of BWPs during a timing threshold. The operations of 1805 may be performed according to the methods described herein. In some examples, aspects of the operations of 1805 may be performed by a switching operation component as described with reference to FIGS. 10 through 13.

At 1810, the base station may communicate with the UE according to the second BWP based on transmitting the indication. The operations of 1810 may be performed according to the methods described herein. In some examples, aspects of the operations of 1810 may be performed by a BWP component as described with reference to FIGS. 10 through 13.

Example 1: A method for wireless communications at a user equipment (UE), comprising: identifying a beam used for communicating with a network entity, the beam associated with a plurality of bandwidth parts including a reference bandwidth part with a first frequency; receiving a bandwidth part configuration for the plurality of bandwidth parts, the bandwidth part configuration based at least in part on changing a frequency for at least one bandwidth part of the plurality of bandwidth parts from the first frequency to a second frequency; and communicating with the network entity according to the bandwidth part configuration.

Example 2: The method of example 1, the receiving the bandwidth part configuration comprises: identifying a bandwidth part configuration for each bandwidth part of the plurality of bandwidth parts is determined independent of the reference bandwidth part; and receiving the bandwidth part configuration for the each bandwidth part of the plurality of bandwidth parts.

Example 3: The method of example 1 or 2, further comprising: receiving, from the network entity, an indication that the bandwidth part configuration is determined independent of the reference bandwidth part, wherein receiving the bandwidth part configuration for each bandwidth part of the plurality of bandwidth parts is based at least in part on the received indication.

Example 4: The method of any of examples 1 to 3, wherein the plurality of bandwidth parts are downlink bandwidth parts.

Example 5: The method of any of examples 1 to 3, wherein the plurality of bandwidth parts are uplink bandwidth parts.

Example 6: The method of any of examples 1 to 5, wherein a bandwidth part of the plurality of bandwidth parts is an initial bandwidth part.

Example 7: The method of any of examples 1 to 6, the receiving the bandwidth part configuration comprises: receiving a bandwidth part configuration for a set of the plurality of bandwidth parts on the beam.

Example 8: The method of any of examples 1 to 7, wherein the set of the plurality of bandwidth parts comprises uplink bandwidth parts.

Example 9: The method of any of examples 1 to 7, wherein the set of the plurality of bandwidth parts comprises downlink bandwidth parts.

Example 10: The method of any of examples 1 to 6, the receiving the bandwidth part configuration comprises: receiving a first bandwidth part configuration for a first set of the plurality of bandwidth parts on a first beam, the first beam used for communicating with the network entity; and receiving a second bandwidth part configuration on a second beam, the second beam different than the first beam.

Example 11: The method of example 10, further comprising: determining that the second bandwidth part configuration is for a second set of the plurality of bandwidth parts associated with the second beam and is based at least in part on the reference bandwidth part, the first set of the plurality of bandwidth parts comprising the reference bandwidth part.

Example 12: The method of examples 10 or 11, further comprising: determining a first information element associated with the reference bandwidth part is the same as a second information element associated with a bandwidth part in the second set of the plurality of bandwidth parts, wherein the second bandwidth part configuration comprises an identifier corresponding to the reference bandwidth part.

Example 13: The method of any of examples 10 to 12, further comprising: determining the first information element and the second information element are the same based at least in part on an absence of the second information element.

Example 14: The method of examples 10 to 12, further comprising: receiving, from the network entity, a message indicating the first information element and the second information element are the same, wherein determining the first information element is the same as the second information element is based at least in part on the message.

Example 15: The method of examples 10 or 11, further comprising: receiving, in the second bandwidth part configuration, an indication of a difference between the first frequency and the second frequency and an identifier corresponding to the reference bandwidth part, the second frequency associated with the second set of the plurality of bandwidth parts.

Example 16: The method of any of examples 1 to 15, further comprising: receiving, from the network entity, an indicator corresponding to the bandwidth part configuration, wherein receiving the second bandwidth part configuration on the second beam is based at least in part on the received indicator.

Example 17: The method of any of examples 1 to 16, wherein the second beam is used for communicating with the network entity.

Example 18: The method of any of examples 1 to 16, wherein the network entity is a first network entity and the second beam is used for communicating with a second network entity different from the first network entity.

Example 19: The method of any of examples 1 to 18, further comprising: receiving the bandwidth part configuration via a radio resource control signaling message, a system information block, or both.

Example 20: The method of any of examples 1 to 19, further comprising: receiving, from the network entity, an indication of the reference bandwidth part comprising a bandwidth part identifier, a beam identifier, or both.

Example 21: The method of any of examples 1 to 20 further comprising: receiving, from the network entity, an indication of a difference between the first frequency and the second frequency, the indication comprising an integer multiplier, a beam identifier, a synchronization signal block index, or a combination.

Example 22: The method of any of examples 1 to 21, further comprising: receiving, from the network entity, a configuration corresponding to a mapping of the indication to the difference between the first frequency and the second frequency.

Example 23: The method of any of examples 1 to 22, the identifying the beam comprises: identifying a synchronization signal block index, a cell identifier, a beam identifier, or a combination thereof.

Example 24: The method of any of examples 1 to 23, wherein the UE and the network entity are associated with a non-terrestrial network (NTN).

Example 25: A method for wireless communications at a user equipment (UE), comprising: identifying a timing threshold associated with a bandwidth part switching operation for a plurality of bandwidth parts associated with a beam used for communicating with a network entity, the bandwidth part switching operation comprising switching from a first bandwidth part of the plurality of bandwidth parts to a second bandwidth part of the plurality of bandwidth parts; switching from the first bandwidth part of the plurality of bandwidth parts to the second bandwidth part of the plurality of bandwidth parts during the timing threshold; and communicating with the network entity according to the second bandwidth part based at least in part on the switching.

Example 26: The method of example 25, wherein a bandwidth part of the plurality of bandwidth parts is an initial bandwidth part.

Example 27: The method of examples 25 or 26, further comprising: receiving, from the network entity, an indication to perform the bandwidth part switching operation, wherein switching from the first bandwidth part to the second bandwidth part is based at least in part on the indication.

Example 28: The method of any of examples 25 to 27, further comprising: receiving, from the network entity, an indication of the timing threshold associated with the bandwidth part switching operation.

Example 29: The method of any of examples 25 to 28, the identifying the timing threshold comprising: determining a first difference between a first frequency associated with the first bandwidth part and a second frequency associated with the second bandwidth part, the timing threshold based at least in part on the first difference between the first frequency and the second frequency.

Example 30: The method of example 29, further comprising: determining a second difference between a first set of parameters associated with the first bandwidth part and a second set of parameters associated with the second bandwidth part, the timing threshold based at least in part on the second difference between the first set of parameters and the second set of parameters.

Example 31: The method of example 29 or 30, wherein the timing threshold is greater based at least in part on the second difference.

Example 32: The method of any of examples 29 to 31, wherein the first set of parameters and the second set of parameters comprise a subcarrier spacing, a cyclic prefix duration, a control resource set, a search space, or a combination thereof.

Example 33: The method of any of examples 25 to 32, wherein the UE and the network entity are associated with a non-terrestrial network (NTN).

Example 34: A method for wireless communications at a network entity, comprising: transmitting, to a user equipment (UE), an indication of a bandwidth part configuration corresponding to a plurality of bandwidth parts associated with a beam used for communicating with the UE, the bandwidth part configuration based at least in part on changing a frequency for the plurality of bandwidth parts from a first frequency associated with a reference bandwidth part to a second frequency; and communicating with the UE according to the bandwidth part configuration.

Example 35: The method of example 34, the transmitting the bandwidth part configuration comprises: determining a bandwidth part configuration for each bandwidth part of the plurality of bandwidth parts independent of the reference bandwidth part; and transmitting the bandwidth part configuration for each bandwidth part of the plurality of bandwidth parts.

Example 36: The method of example 34 or 35, further comprising: transmitting, to the UE, an indication that the bandwidth part configuration is determined independent of the reference bandwidth part, wherein transmitting the bandwidth part configuration for each bandwidth part of the plurality of bandwidth parts is based at least in part on the indicator.

Example 37: The method of any of examples 34 to 36, wherein the plurality of bandwidth parts are downlink bandwidth parts.

Example 38: The method of any of examples 34 to 36, wherein the plurality of bandwidth parts are uplink bandwidth parts.

Example 39: The method of any of examples 34 to 38, wherein a bandwidth part of the plurality of bandwidth parts is an initial bandwidth part.

Example 40: The method of any of examples 34 to 39, the transmitting the bandwidth part configuration comprises: transmitting a bandwidth part configuration for a set of the plurality of bandwidth parts on the beam.

Example 41: The method of any of examples 34 to 40, wherein the set of the plurality of bandwidth parts comprises uplink bandwidth parts.

Example 42: The method of any of examples 34 to 40, wherein the set of the plurality of bandwidth parts comprises downlink bandwidth parts.

Example 43: The method of any of examples 34 to 39, the transmitting the bandwidth part configuration comprises: transmitting a first bandwidth part configuration for a first set of the plurality of bandwidth parts on a first beam, the first beam used for communicating with the UE; and transmitting a second bandwidth part configuration on a second beam, the second beam different than the first beam.

Example 44: The method of example 43, further comprising: determining that the second bandwidth part configuration is for a second set of the plurality of bandwidth parts associated with the second beam and is based at least in part on the reference bandwidth part, the first set of the plurality of bandwidth parts comprising the reference bandwidth part.

Example 45: The method of examples 43 or 44, further comprising: determining a first information element associated with the reference bandwidth part is the same as a second information element associated with a bandwidth part in the second set of the plurality of bandwidth parts, wherein the second bandwidth part configuration comprises an identifier corresponding to the reference bandwidth part.

Example 46: The method of any of examples 43 to 45, further comprising: determining the first information element and the second information element are the same based at least in part on an absence of the second information element.

Example 47: The method of examples 43 to 45, further comprising: transmitting, to the UE, a message indicating the first information element and the second information element are the same, wherein determining the first information element is the same as the second information element is based at least in part on the message.

Example 48: The method of examples 43 or 44, further comprising: transmitting, in the second bandwidth part configuration, an indication of a difference between the first frequency and the second frequency and an identifier corresponding to the reference bandwidth part, the second frequency associated with the second set of the plurality of bandwidth parts.

Example 49: The method of any of examples 34 to 48, further comprising: transmitting, to the UE, an indicator corresponding to the bandwidth part configuration, wherein receiving the second bandwidth part configuration is based at least in part on the received indicator.

Example 50: The method of any of examples 34 to 49, transmitting the bandwidth part configuration via a radio resource control signaling message, a system information block, or both.

Example 51: The method of any of examples 34 to 50, transmitting, to the UE, an indication of the reference bandwidth part comprising a bandwidth part identifier, a beam identifier, or both.

Example 52: The method of any of examples 34 to 51 further comprising: transmitting, to the UE, an indication of a difference between the first frequency and the second frequency, the indication comprising an integer multiplier, a beam identifier, a synchronization signal block index, or a combination.

Example 53: The method of any of examples 34 to 52, further comprising: transmitting, to the UE, a configuration corresponding to a mapping of the indication to the difference between the first frequency and the second frequency.

Example 54: The method of any of examples 34 to 53, wherein the UE and the network entity are associated with a non-terrestrial network (NTN).

Example 55: A method for wireless communications at a network entity, comprising: transmitting, to a user equipment (UE), an indication to perform a bandwidth part switching operation for a plurality of bandwidth parts associated with a beam used for communicating with the UE, the bandwidth part switching operation comprising switching from a first bandwidth part of the plurality of bandwidth parts to a second bandwidth part of the plurality of bandwidth parts during a timing threshold; and communicating with the UE according to the second bandwidth part based at least in part on transmitting the indication.

Example 56: The method of example 55, wherein a bandwidth part of the plurality of bandwidth parts is an initial bandwidth part.

Example 57: The method of examples 55 or 56, further comprising: transmitting, to the UE, an indication of the timing threshold associated with the bandwidth part switching operation.

Example 58: The method of any of examples 55 to 57, further comprising: determining a first difference between a first frequency associated with the first bandwidth part and a second frequency associated with the second bandwidth part, the timing threshold based at least in part on the first difference between the first frequency and the second frequency.

Example 59: The method of example 58, further comprising: determining a second difference between a first set of parameters associated with the first bandwidth part and a second set of parameters associated with the second bandwidth part, the timing threshold based at least in part on the second difference between the first set of parameters and the second set of parameters.

Example 60: The method of example 58 or 59, wherein the timing threshold is greater based at least in part on the second difference.

Example 61: The method of any of examples 58 to 60, wherein the first set of parameters and the second set of parameters comprise a subcarrier spacing, a cyclic prefix duration, a control resource set, a search space, or a combination thereof.

Example 62: The method of any of examples 55 to 61, wherein the UE and the network entity are associated with a non-terrestrial network (NTN).

Example 63: An apparatus for use in the method for wireless communications as claimed in claims 1-22.

Example 64: An apparatus for wireless communications comprising a processor; and memory coupled to the processor, the processor and memory configured to perform a method of any of examples 1 to 22.

Example 65: An apparatus for wireless communications comprising a processor; and memory coupled to the processor, the processor and memory configured to perform a method of any of examples 23 to 31.

Example 66: An apparatus for wireless communications comprising a processor; and memory coupled to the processor, the processor and memory configured to perform a method of any of examples 32 to 50.

Example 67: An apparatus for wireless communications comprising a processor; and memory coupled to the processor, the processor and memory configured to perform a method of any of examples 51 to 58.

Example 68: An apparatus comprising at least one means for performing a method of any of examples 1 to 22.

Example 69: An apparatus comprising at least one means for performing a method of any of examples 23 to 31.

Example 70: An apparatus comprising at least one means for performing a method of any of examples 32 to 50.

Example 71: An apparatus comprising at least one means for performing a method of any of examples 51 to 58.

Example 72: A non-transitory computer-readable medium storing code for wireless communications, the code comprising instructions executable by a processor to perform a method of any of examples 1 to 22.

Example 73: A non-transitory computer-readable medium storing code for wireless communications, the code comprising instructions executable by a processor to perform a method of any of examples 23 to 31.

Example 74: A non-transitory computer-readable medium storing code for wireless communications, the code comprising instructions executable by a processor to perform a method of any of examples 32 to 50.

Example 75: A non-transitory computer-readable medium storing code for wireless communications, the code comprising instructions executable by a processor to perform a method of any of examples 51 to 58.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE) comprising:
   one or more memories; and
   one or more processors coupled with the one or more memories and configured to cause the UE to:
   identify a first beam used to communicate with a network entity, the first beam associated with a plurality of bandwidth parts including a reference bandwidth part with a first frequency, wherein the network entity is a non-terrestrial network entity;
   receive a bandwidth part configuration for the plurality of bandwidth parts, the bandwidth part configuration based at least in part on a change in frequency for at least one bandwidth part of the plurality of bandwidth parts from the first frequency to a second frequency, wherein the second frequency is associated with a second beam different from the first beam;
   receive an indication of a frequency shift between the first frequency and the second frequency, wherein the frequency shift is applied to the reference bandwidth part to derive a reference bandwidth part for the second beam; and
   communicate with the network entity according to the bandwidth part configuration.

2. The apparatus of claim 1, wherein to receive the bandwidth part configuration, the one or more processors are configured to cause the UE to:
   identify respective bandwidth part configurations for each bandwidth part of the plurality of bandwidth parts independent of the reference bandwidth part; and receive the bandwidth part configuration for each band-width part of the plurality of bandwidth parts.

3. The apparatus of claim 2, wherein the one or more processors are further configured to cause the UE to:
  receive a second indication that the bandwidth part con-figuration is identified independent of the reference bandwidth part, wherein the bandwidth part configu-ration for each bandwidth part of the plurality of bandwidth parts is received based at least in part on the second indication.

4. The apparatus of claim 1, wherein the plurality of bandwidth parts are downlink bandwidth parts.

5. The apparatus of claim 1, wherein the plurality of bandwidth parts are uplink bandwidth parts.

6. The apparatus of claim 1, wherein a bandwidth part of the plurality of bandwidth parts is an initial bandwidth part.

7. The apparatus of claim 1, wherein to receive the bandwidth part configuration, the one or more processors are configured to cause the UE to:
  receive the bandwidth part configuration for one or more bandwidth parts of the plurality of bandwidth parts on the first beam.

8. The apparatus of claim 7, wherein the one or more bandwidth parts of the plurality of bandwidth parts com-prises uplink bandwidth parts.

9. The apparatus of claim 7, wherein the one or more bandwidth parts of the plurality of bandwidth parts com-prises downlink bandwidth parts.

10. The apparatus of claim 1, wherein to receive the bandwidth part configuration, the one or more processors are configured to cause the UE to:
  receive a first bandwidth part configuration for one or more first bandwidth parts of the plurality of bandwidth parts on the first beam, the first beam used to commu-nicate with the network entity; and
  receive a second bandwidth part configuration on the second beam.

11. The apparatus of claim 10, wherein the one or more processors are further configured to cause the UE to:
  identify that the second bandwidth part configuration is for one or more second bandwidth parts of the plurality of bandwidth parts associated with the second beam and is based at least in part on the reference bandwidth part, the one or more first bandwidth parts of the plurality of bandwidth parts comprising the reference bandwidth part.

12. The apparatus of claim 11, wherein the one or more processors are further configured to cause the UE to:
  identify a first information element associated with the reference bandwidth part is the same as a second information element associated with a bandwidth part in the one or more second bandwidth parts of the plurality of bandwidth parts, wherein the second band-width part configuration comprises an identifier corre-sponding to the reference bandwidth part.

13. The apparatus of claim 12, wherein the one or more processors are further configured to cause the UE to:
  identify the first information element and the second information element are the same based at least in part on an absence of the second information element.

14. The apparatus of claim 12, wherein the one or more processors are further configured to cause the UE to:
  receive a message that indicates the first information element and the second information element are the same, wherein the first information element is identi-fied to be the same as the second information element based at least in part on the message.

15. The apparatus of claim 11, wherein the one or more processors are further configured to cause the UE to:
  receive, in the second bandwidth part configuration, the indication of the frequency shift and an identifier corresponding to the reference bandwidth part, the second frequency associated with the one or more second bandwidth parts of the plurality of bandwidth parts.

16. The apparatus of claim 10, wherein the one or more processors are further configured to cause the UE to:
  receive an indicator corresponding to the bandwidth part configuration, wherein the second bandwidth part con-figuration is received on the second beam based at least in part on the indicator.

17. The apparatus of claim 10, wherein the second beam is used to communicate with the network entity.

18. The apparatus of claim 10, wherein the network entity is a first network entity and the second beam is used to communicate with a second network entity different from the first network entity.

19. The apparatus of claim 1, wherein the one or more processors are further configured to cause the UE to:
  receive the bandwidth part configuration via a radio resource control signaling message, a system informa-tion block, or both.

20. The apparatus of claim 1, wherein the one or more processors are further configured to cause the UE to:
  receive a second indication of the reference bandwidth part comprising a bandwidth part identifier, a beam identifier, or both.

21. The apparatus of claim 1, wherein the indication of the frequency shift comprises an integer multiplier, a beam identifier, a synchronization signal block index, or a com-bination.

22. The apparatus of claim 21, wherein the one or more processors are further configured to cause the UE to:
  receive a configuration corresponding to a mapping of the indication to the frequency shift.

23. The apparatus of claim 1, wherein to identify the first beam, the one or more processors are further configured to cause the UE to:
  identify a synchronization signal block index, a cell identifier, a beam identifier, or a combination thereof.

24. An apparatus for wireless communication at a user equipment (UE), comprising:
  one or more memories; and
  one or more processors coupled with the one or more memories and configured to cause the UE to:
    identify a timing threshold associated with a bandwidth part switching operation for a plurality of bandwidth parts associated with a beam used to communicate with a network entity, the bandwidth part switching operation comprising a switch from a first bandwidth part of the plurality of bandwidth parts to a second bandwidth part of the plurality of bandwidth parts;
    switch from the first bandwidth part of the plurality of bandwidth parts to the second bandwidth part of the plurality of bandwidth parts during the timing threshold; and
    communicate with the network entity according to the second bandwidth part based at least in part on the switch.

25. The apparatus of claim 24, wherein a bandwidth part of the plurality of bandwidth parts is an initial bandwidth part.

26. The apparatus of claim 24, wherein the one or more processors are further configured to cause the UE to:

receive an indication to perform the bandwidth part switching operation, wherein the switch from the first bandwidth part to the second bandwidth part is based at least in part on the indication.

27. The apparatus of claim 24, wherein the one or more processors are further configured to cause the UE to:

receive an indication of the timing threshold associated with the bandwidth part switching operation.

28. An apparatus for wireless communication at a non-terrestrial network entity, comprising:

one or more memories; and one or more processors coupled with the one or more memories and configured to cause the non-terrestrial network entity to:

transmit a first indication of a bandwidth part configuration corresponding to a plurality of bandwidth parts associated with a first beam used to communicate with a user equipment (UE), the bandwidth part configuration based at least in part on a change in frequency for the plurality of bandwidth parts from a first frequency associated with a reference bandwidth part to a second frequency, wherein the second frequency is associated with a second beam different from the first beam;

transmit a second indication of a frequency shift between the first frequency and the second frequency, wherein the frequency shift is for application to the reference bandwidth part to derive a reference bandwidth part for the second beam; and communicate with the UE according to the bandwidth part configuration.

29. The apparatus of claim 28, wherein, to transmit the bandwidth part configuration, the one or more processors are configured to cause the non-terrestrial network entity to:

determine respective bandwidth part configurations for each bandwidth part of the plurality of bandwidth parts independent of the reference bandwidth part; and transmit the bandwidth part configuration for each bandwidth part of the plurality of bandwidth parts.

30. The apparatus of claim 28, wherein, to transmit the bandwidth part configuration, the one or more processors are configured to cause the non-terrestrial network entity to:

transmit a bandwidth part configuration for one or more bandwidth parts of the plurality of bandwidth parts on the first beam.

31. The apparatus of claim 28, wherein, to transmit the bandwidth part configuration, the one or more processors are configured to cause the non-terrestrial network entity to:

transmit a first bandwidth part configuration for one or more first bandwidth parts of the plurality of bandwidth parts on the first beam, the first beam used to communicate with the UE; and transmit a second bandwidth part configuration on the second beam.

32. An apparatus for wireless communication at a non-terrestrial network entity, comprising:

one or more memories; and one or more processors coupled with the one or more memories and configured to cause the non-terrestrial network entity to:

transmit an indication to perform a bandwidth part switching operation for a plurality of bandwidth parts associated with a beam used for communication with a user equipment (UE), the bandwidth part switching operation comprising a switch from a first bandwidth part of the plurality of bandwidth parts to a second bandwidth part of the plurality of bandwidth parts during a timing threshold; and communicate with the UE according to the second bandwidth part based at least in part on the indication.

33. The apparatus of claim 32, wherein the one or more processors are further configured to cause the non-terrestrial network entity to:

determine a first difference between a first frequency associated with the first bandwidth part and a second frequency associated with the second bandwidth part, the timing threshold based at least in part on the first difference between the first frequency and the second frequency.

34. The apparatus of claim 32, wherein the one or more processors are further configured to cause the non-terrestrial network entity to:

transmit an indication of the timing threshold associated with the bandwidth part switching operation.

35. The apparatus of claim 32, wherein the one or more processors are further configured to cause the non-terrestrial network entity to:

determine a second difference between a first set of parameters associated with the first bandwidth part and a second set of parameters associated with the second bandwidth part, the timing threshold based at least in part on the second difference between the first set of parameters and the second set of parameters.

36. A method for wireless communications at a user equipment (UE), comprising:

identifying a first beam used for communicating with a network entity, the first beam associated with a plurality of bandwidth parts including a reference bandwidth part with a first frequency, wherein the network entity is a non-terrestrial network entity;

receiving a bandwidth part configuration for the plurality of bandwidth parts, the bandwidth part configuration based at least in part on changing a frequency for at least one bandwidth part of the plurality of bandwidth parts from the first frequency to a second frequency, wherein the second frequency is associated with a second beam different from the first beam;

receiving an indication of a frequency shift between the first frequency and the second frequency, wherein the frequency shift is applied to the reference bandwidth part to derive a reference bandwidth part for the second beam; and communicating with the network entity according to the bandwidth part configuration.

37. A method for wireless communication at a user equipment (UE), comprising:

identifying a timing threshold associated with a bandwidth part switching operation for a plurality of bandwidth parts associated with a beam used to communicate with a network entity, the bandwidth part switching operation comprising a switch from a first bandwidth part of the plurality of bandwidth parts to a second bandwidth part of the plurality of bandwidth parts;

switching from the first bandwidth part of the plurality of bandwidth parts to the second bandwidth part of the plurality of bandwidth parts during the timing threshold; and communicating with the network entity according to the second bandwidth part based at least in part on the switch.

38. A method for wireless communication at a non-terrestrial network entity, comprising:

transmit an indication of a bandwidth part configuration corresponding to a plurality of bandwidth parts associated with a first beam used to communicate with a user equipment (UE), the bandwidth part configuration based at least in part on a change in frequency for the plurality of bandwidth parts from a first frequency associated with a reference bandwidth part to a second frequency, wherein the second frequency is associated with a second beam different from the first beam;

transmit an indication of a frequency shift between the first frequency and the second frequency, wherein the frequency shift is for application to the reference bandwidth part to derive a reference bandwidth part for the second beam; and communicate with the UE according to the bandwidth part configuration.

39. A method or wireless communication at a non-terrestrial network entity, comprising:

transmitting an indication to perform a bandwidth part switching operation for a plurality of bandwidth parts associated with a beam used for communication with a user equipment (UE), the bandwidth part switching operation comprising a switch from a first bandwidth part of the plurality of bandwidth parts to a second bandwidth part of the plurality of bandwidth parts during a timing threshold; and communicating with the UE according to the second bandwidth part based at least in part on the indication.

* * * * *